(12) United States Patent
Smith

(10) Patent No.: US 8,406,770 B2
(45) Date of Patent: Mar. 26, 2013

(54) METHOD AND SYSTEM FOR USING CELLULAR DATE FOR TRANSPORTATION PLANNING AND ENGINEERING

(75) Inventor: Cyrus W. Smith, Marietta, GA (US)

(73) Assignee: Airsage, Inc., Atlanta, GA (US)

( * ) Notice: Subject to any disclaimer, the term of this patent is extended or adjusted under 35 U.S.C. 154(b) by 509 days.

(21) Appl. No.: 11/472,676

(22) Filed: Jun. 22, 2006

(65) Prior Publication Data
US 2006/0293046 A1 Dec. 28, 2006

Related U.S. Application Data

(60) Provisional application No. 60/693,283, filed on Jun. 23, 2005.

(51) Int. Cl.
*H04W 36/00* (2009.01)
(52) U.S. Cl. .................................. 455/440; 340/991
(58) Field of Classification Search .................. 455/456, 455/423
See application file for complete search history.

(56) References Cited

U.S. PATENT DOCUMENTS

| | | | | |
|---|---|---|---|---|
| 5,402,117 A * | 3/1995 | Zijderhand | ................... | 340/905 |
| 5,532,690 A * | 7/1996 | Hertel | ........................... | 340/989 |
| 6,356,836 B1 * | 3/2002 | Adolph | ........................ | 701/208 |
| 6,490,519 B1 * | 12/2002 | Lapidot et al. | ................. | 701/117 |
| 6,577,946 B2 * | 6/2003 | Myr | ............................... | 701/117 |
| 6,813,556 B2 * | 11/2004 | Watanabe | ..................... | 701/117 |
| 6,823,257 B2 | 11/2004 | Clapper | | |
| 2003/0014181 A1 * | 1/2003 | Myr | ............................... | 701/117 |
| 2003/0078055 A1 * | 4/2003 | Smith et al. | ................... | 455/456 |
| 2004/0068364 A1 * | 4/2004 | Zhao et al. | ..................... | 701/201 |
| 2004/0243664 A1 * | 12/2004 | Horstemeyer | ................ | 709/200 |
| 2005/0099321 A1 | 5/2005 | Pearce | | |
| 2005/0288046 A1 * | 12/2005 | Zhao et al. | ................... | 455/466 |

FOREIGN PATENT DOCUMENTS

| | | |
|---|---|---|
| EP | 1213905 | 6/2002 |
| WO | WO 03/024132 | 3/2003 |

OTHER PUBLICATIONS

International Search Report, PCT/US2006/024029, Sep. 21, 2007, 1 page.
European Search Report, EP 06773638.9, Jan. 3, 2011.

* cited by examiner

*Primary Examiner* — Marcos Batista
(74) *Attorney, Agent, or Firm* — King & Spalding

(57) ABSTRACT

Using data from a wireless telephony network to support transportation planning and engineering. Data related to wireless network users is extracted from the wireless network to determine the location of a mobile station. Additional location records for the mobile station can be used to characterize the movement of the mobile station: its speed, its route, its point of origin and destination, and its primary and secondary transportation analysis zones. Aggregating data associated with multiple mobile stations allows characterizing and predicting traffic parameters, including traffic speeds and volumes along routes.

6 Claims, 19 Drawing Sheets

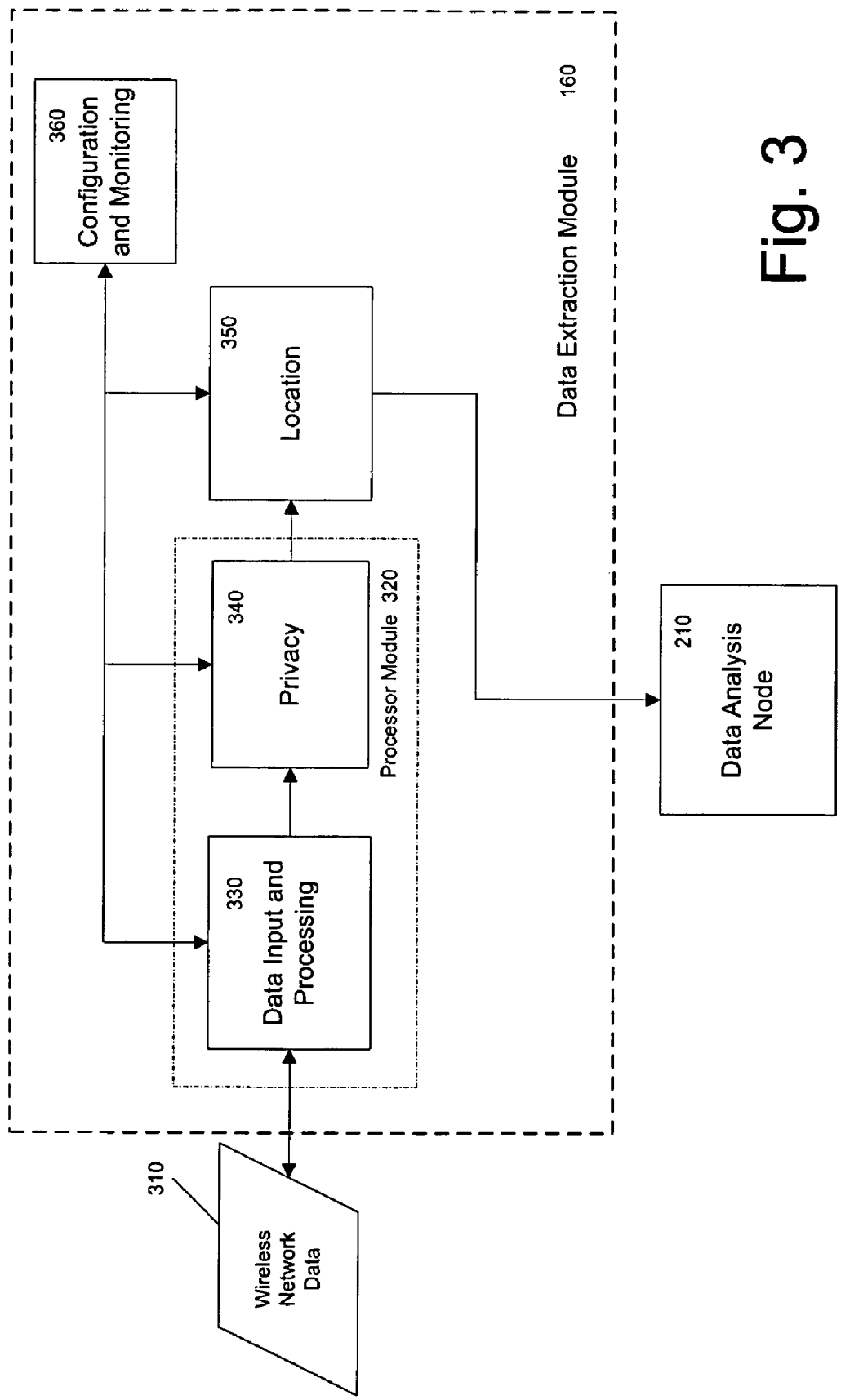

METHOD AND SYSTEM FOR USING CELLULAR DATE FOR TRANSPORTATION PLANNING AND ENGINEERING

STATEMENT OF RELATED PATENT APPLICATIONS

This non-provisional patent application claims priority under 35 U.S.C. §119 to U.S. Provisional Patent Application No. 60/693,283, titled Method and System for Using Cellular Data for Transportation Planning and Engineering, filed Jun. 23, 2005. This provisional application is hereby fully incorporated herein by reference.

FIELD OF THE INVENTION

This invention relates to a system and method for using wireless telephony network data for transportation planning and engineering. More particularly, this invention relates to determining traffic patterns and road usage based on determining locations over time of wireless telephony users to support transportation planning and engineering.

BACKGROUND OF THE INVENTION

Transportation planning and engineering relies heavily on empirical data and extensive use of data analysis techniques that characterize and predict the flow of traffic in a geographic region. The use of these traffic-related data is not new. Traditional methods of empirical transportation data collection include questionnaires/interviews, count stations, speed sensors, video cameras, and other approaches that provide information about the movement of people and goods along a specific transportation corridor or throughout a region.

These traffic-related data, together with additional land-use planning and budget-related data, serve as input parameters for traffic planning and engineering analyses, enabling the identifying of traffic related issues and their solutions. These analyses can vary from qualitative evaluations of traffic characteristics and trends (e.g., that traffic volume along the I-75 corridor is increasing) to sophisticated models that quantify the traffic flow along multiple routes and predict the effects of changes to the transportation infrastructure, for example, road closings due to construction, road widening, traffic light sequencing, or the effect of a new commercial or residential construction project. As with most engineering analyses, the accuracy and usefulness of the results depends, at least in part, on the quality and quantity of input data. The high cost of data collection using the traditional methods identified above often requires planners and engineers to make liberal assumptions, extrapolations, and inferences that may lead to erroneous conclusions.

Additionally, measurements such as trends in speeds and travel times that quantify the effects of and identify the causes of congestion are needed. These data have traditionally been difficult to capture. In an effort to relieve traffic congestion, transportation planning and engineering groups spend billions of dollars each year on studies and research to help set priorities, define optimum solutions, and convey these solutions to legislators and the general public.

In view of the foregoing, there is a need for a cost effective system and method that collects and analyzes traffic data for use in traffic planning and engineering. The present invention provides a system and method that collects and processes information from wireless telephony systems and users of those systems to support transportation planning and engineering.

SUMMARY OF THE INVENTION

The present invention provides a system and method that collects and processes information from wireless telephony systems and users to support transportation planning and engineering. In one aspect of the invention, a system for using data from a wireless telephony network to support traffic planning and engineering is disclosed. This system includes a data extraction module, logically coupled to one or more wireless telephony networks, operable to receive location data associated with a mobile station user of one of the wireless telephony networks; and a data analysis module, logically coupled to the data extraction module, operable to use the location data to support transportation planning and engineering.

In another aspect of the present invention, a method for using data from a wireless telephony network to support traffic-planning and engineering is disclosed. The method includes (1) determining a location of a mobile station using the wireless telephony network; (2) characterizing a transportation infrastructure within a geographic region; and (3) determining a transportation parameter associated with the mobile station using the transportation infrastructure. The determined transportation parameter supports transportation planning and engineering.

In another aspect of the present invention, a method for using data from a wireless telephony network for associating a mobile station with a geographic region is disclosed. The method includes (1) retrieving a location record associated with the mobile station; (2) establishing one or more criteria for associating the mobile station with the primary transportation analysis zone; and (3) applying the one or more criteria to associate the mobile station with the primary transportation analysis zone. The criteria relate the mobile station to the primary transportation analysis zone based on a time parameter associated with the mobile station and the primary transportation analysis zone.

In yet another aspect of the present invention, a method for using data from a wireless telephony network for identifying an origin and a destination for a trip made by a user of a mobile station is disclosed. The method includes (1) identifying a first location record for the mobile station comprising a first geographic region associated with the origin of a trip; (2) identifying one or more subsequent location records for the mobile station associated with the trip; and (3) identifying a second geographic region for the destination for the trip. The one or more of the subsequent location records for the mobile station include the second geographic region for a set time interval.

The aspects of the present invention may be more clearly understood and appreciated from a review of the following detailed description of the disclosed embodiments and by reference to the drawings and claims.

BRIEF DESCRIPTION OF THE DRAWINGS

FIG. 3 depicts a block diagram of a data extraction module within a transportation planning and engineering system in accordance with an exemplary embodiment of the present invention.

DETAILED DESCRIPTION OF THE EXEMPLARY EMBODIMENTS

Exemplary embodiments of the present invention provide systems and methods for using data from a wireless telephony network to support transportation planning and engineering. Data related to wireless network users is extracted from the wireless network to determine the location of a mobile station. Additional location records for the mobile station can be used to characterize the movement of the mobile station: its speed, its route, its point of origin and destination, and its primary and secondary transportation analysis zones. Aggregating data from multiple mobile stations allows characterizing and predicting traffic parameters, including traffic speeds and volumes along routes.

Figure 1:
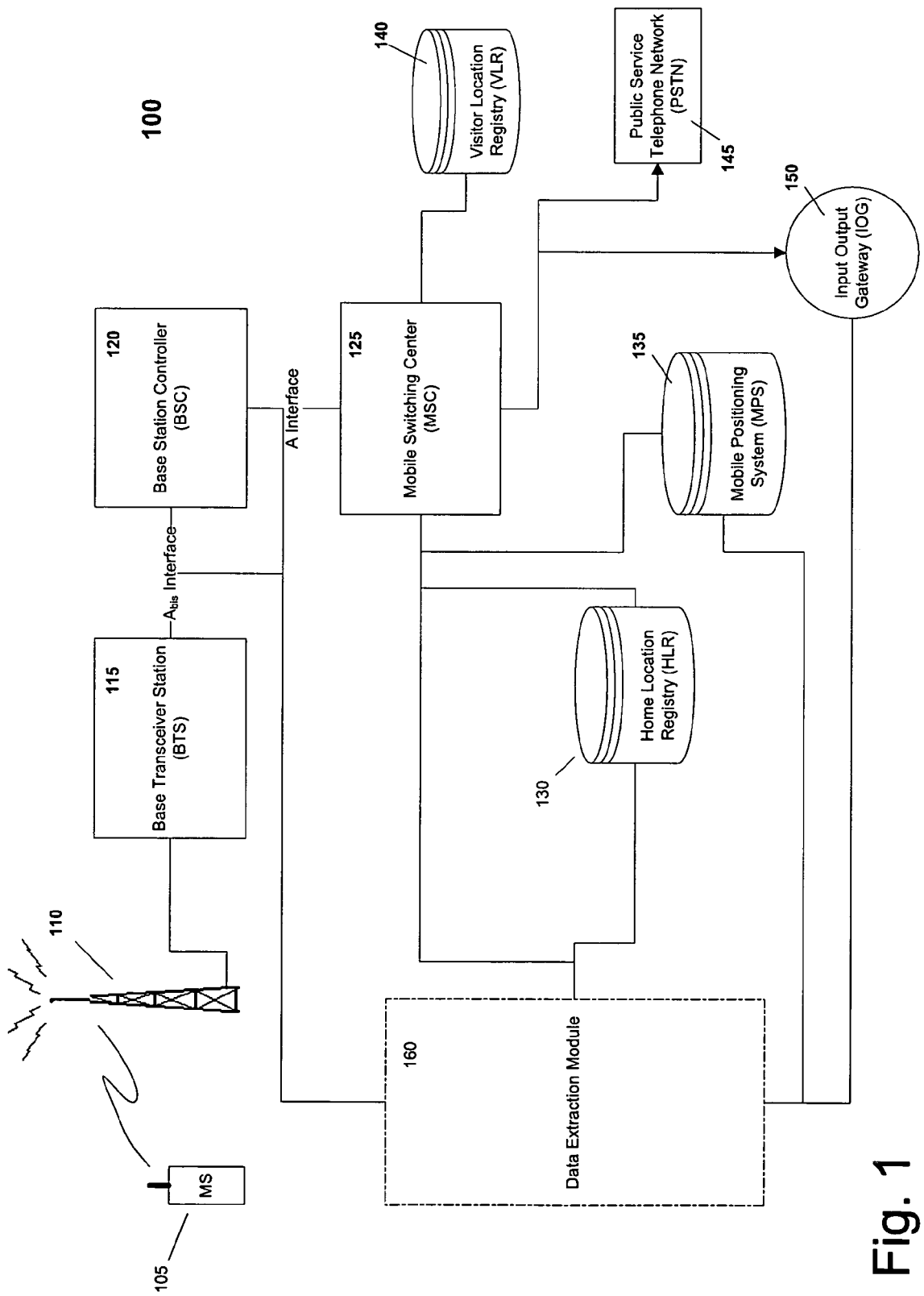
FIG. 1 depicts an operating environment in relation to a wireless telephony network in accordance with an exemplary embodiment of the present invention.

FIG. 1 depicts an operating environment in relation to a wireless telephony network 100 in accordance with an exemplary embodiment of the present invention. Referring to FIG. 1, mobile station (MS) 105 transmits signals to and receives signals from a radiofrequency transmission tower 110 while within a geographic cell covered by the tower. These cells vary in size based on anticipated signal volume. A Base Transceiver System (BTS) 115 is used to provide service to mobile subscribers within its cell. Several Base Transceiver Systems 115 are combined and controlled by a Base Station Controller (BSC) 120 through a connection called the $A_{bis}$ Interface. A Data Extraction Module 160 can interface with the $A_{bis}$ Interface line.

A Mobile Switching Center (MSC) 125 does the complex task of coordinating all the Base Station Controllers, through the A Interface connection, keeping track of all active mobile subscribers using the Visitor Location Register (VLR) 140, maintaining the home subscriber records using the Home Location Register (HLR) 130, and connecting the mobile subscribers to the Public Service Telephone Network (PSTN) 145.

The location of a mobile station 105 can be determined by embedding a GPS chip in the mobile station 105, or by measuring certain signaling characteristics between the mobile station 105 and the BTS 115. In either scenario, the process of locating a mobile station 105 is managed with a Mobile Positioning System (MPS) 135. The MPS 135 uses the same network resources that are used to manage and process calls, which makes its availability somewhat limited.

The Input Output Gateway (IOG) 150 processes call detail records (CDRs) to facilitate such actions as mobile subscriber billing. The IOG 150 receives call-related data from the MSC 125 and can interface with the Data Extraction Module 160.

In the exemplary embodiment of the present invention shown in FIG. 3, the Data Extraction Module 160 may receive data from a variety of locations in the wireless network. These locations include the BSC 120 and its interface, through the $A_{bis}$ Interface, with the BTS 115, MSC 125, the HLR 130, and the MPS 135. The Data Extraction Module 160 can use data from any network element that contains at a minimum the mobile station identifier number, cell ID and a time stamp. Some of the more common data sources are discussed below. One of ordinary skill in the art would appreciate that some or all of the functions of the Data Extraction Module 160 could be conducted behind the "firewall" of the wireless telephony network. Alternatively, some or all of the data extraction operations could be carried out by one or more systems outside of the wireless telephony network. For example, a vendor could operate a system that extracts information from the IOG 150.

CDRs may be requested from billing distribution centers or the distribution centers may autonomously send the records via file transfer protocol (FTP). Alternatively the CDRs may be extracted as they are routinely passed from the IOG 150 to a billing gateway, possibly utilizing a router that duplicates the packets. The specific method used will depend on the equipment and preferences of the wireless service provider.

Handover and Registration messages may be obtained by monitoring the proprietary or standard A-interface signaling between the MSC 125 and the BSCs 120 that it controls. The Data Extraction Module 160 may monitor that signaling directly or it may obtain signaling information from a signal monitoring system such as a protocol analyzer. In the latter case the signaling information may already be filtered to remove extraneous information. See the discussion in conjunction with FIG. 7, below, of the privacy process for an exemplary embodiment of the present invention, which removes information that may identify the user of a specific mobile station 105. Alternatively, these messages may be extracted from a Base Station Manager that continuously monitors message streams on the BTS 115.

The inherent nature of cellular technology requires frequent data communications between the mobile station 105 and the Wireless Telephony Network 100. The approximate location of the mobile station 105 is one of the data elements transmitted from the mobile station 105 to the network 100. This "location awareness" is necessary to ensure that calls can be processed without delay or interruption and support enhanced 911 initiatives. Other data elements collected by the wireless telephony network 100 include the mobile device identification number and, if a call is involved, the calling or called number.

Figure 2:
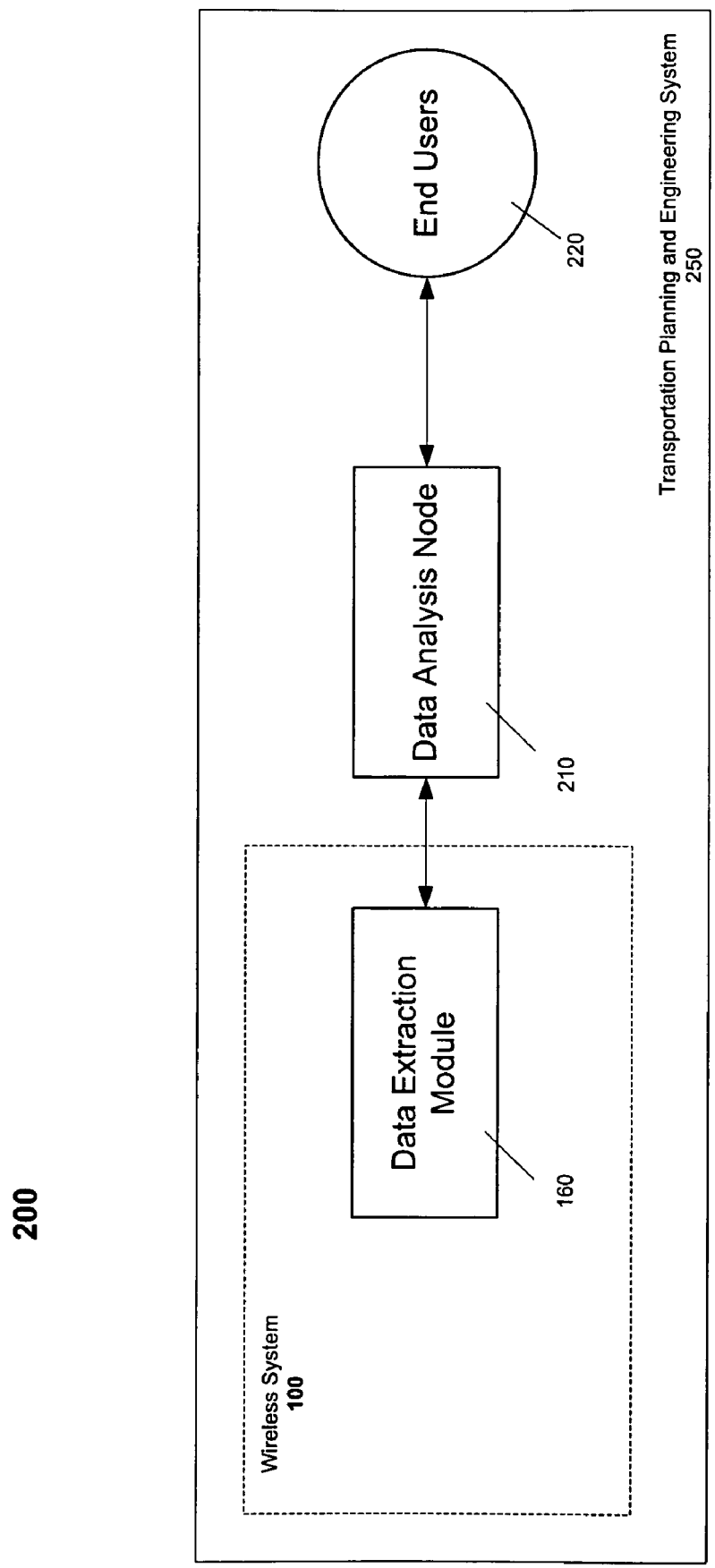
FIG. 2 presents a block diagram showing components of a transportation planning and engineering system in accordance with an exemplary embodiment of the present invention.

FIG. 2 presents a block diagram 200 showing components of a Transportation Planning and Engineering System 250 in accordance with an exemplary embodiment of the present invention. Referring to FIGS. 1 and 2, the Data Extraction Module 160 is depicted as a component of the Wireless Telephony Network 100. One of ordinary skill in the art would appreciate that the Data Extraction Module 160 may be operated by a wireless network carrier or operated separately from the Wireless Telephony Network 100. In one example, the Data Extraction Module's 160 connection with the wireless network 100 would consist of data communications links and otherwise operate outside the network. In another example, another party (that is, an operator other than the wireless carrier) would operate the Data Extraction Module 160 within the Wireless Telephony Network 100.

The Data Extraction Module 160 extracts and manipulates data from the Wireless Telephony Network 100. The Data Extraction Module 160 is connected to a Data Analysis Node 210 such that they can convey data or instructions to one another. This connection may be any type of data connection, such as a local area network, a wide area network, or some other data communications connection. The Data Analysis Node 210 operates on the data extracted by the Data Extraction Module 160 to support transportation planning and engineering. The Data Analysis Node 210 is also connected, again by any type of data connection, to End Users 220. These End Users 220 represent the ultimate users of the analyses generated by the Data Analysis Node 210 and may also supply parameters used in analyses performed by the Data Analysis Node 210.

The exemplary Data Extraction Module 160 and the Data Analysis Node 220 provide two general functions. The Data Extraction Module 160 interfaces with information sources to receive information from those sources. This receipt of information may be continuous, in the sense that the information source supplies information to the Data Extraction Module 160 at regular intervals or as available. This receipt may be initiated by the information source, which may push the information to the Data Extraction Module 160. Other information my be received by the Data Extraction Module 160 based on requests from the Data Extraction Module 160 to the information source.

The Data Analysis Node 220 processes the information received by the Data Extraction Module 160 to support the needs of the End Users 220. This processing may trigger additional information needs, such that the Data Analysis Node 220 requests the information from specific information sources through the Data Extraction Module 160.

FIG. 3 depicts a block diagram 300 of a data extraction module within a transportation planning and engineering system in accordance with an exemplary embodiment of the present invention. Referring to FIGS. 1, 2 and 3, a Wireless Network Data component 310 is communicated to the Data Extraction Module 160. Specifically, in this exemplary embodiment, the Wireless Network Data 310 communicates with a Data Input and Processing Module 330. The Data Input and Processing Module 330 and a Privacy Module 340 are components of a Processor Module 320. The operations of the Data Input and Processing Module 330 are discussed in greater detail below, in connection with FIG. 5. Similarly, the operations of the Privacy Module 340 are discussed in greater detail in connection with FIG. 7, below.

The Processor Module 320 connects to a Location Module 350. The Location Module 350 generates location data associated with mobile stations 105. The Location Module 350 is linked to the Data Analysis Node 210. The Data Analysis Node 210 can access the Location Module 350 to receive location information, or other information, associated with one or more mobile stations 105.

The components of the Data Extraction Module 160, can be controlled by a Configuration and Monitoring Module 360. The Configuration and Monitoring Module 360 monitors the performance of the Data Extraction Module 160 and sets system operating parameters.

Figure 4A:
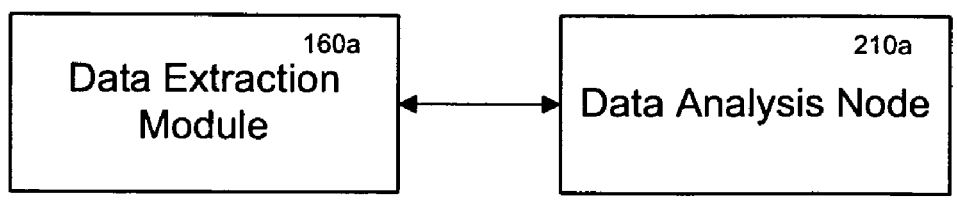
FIG. 4a presents a block diagram showing components of a transportation planning and engineering system in accordance with an exemplary embodiment of the present invention.

FIG. 4a presents a block diagram 400 showing components of a transportation planning and engineering system in accordance with an exemplary embodiment of the present invention. Referring to FIG. 4a, the block diagram 400 depicts a single Data Extraction Module 160a interacting with a single Data Analysis Node 210a.

Figure 4B:
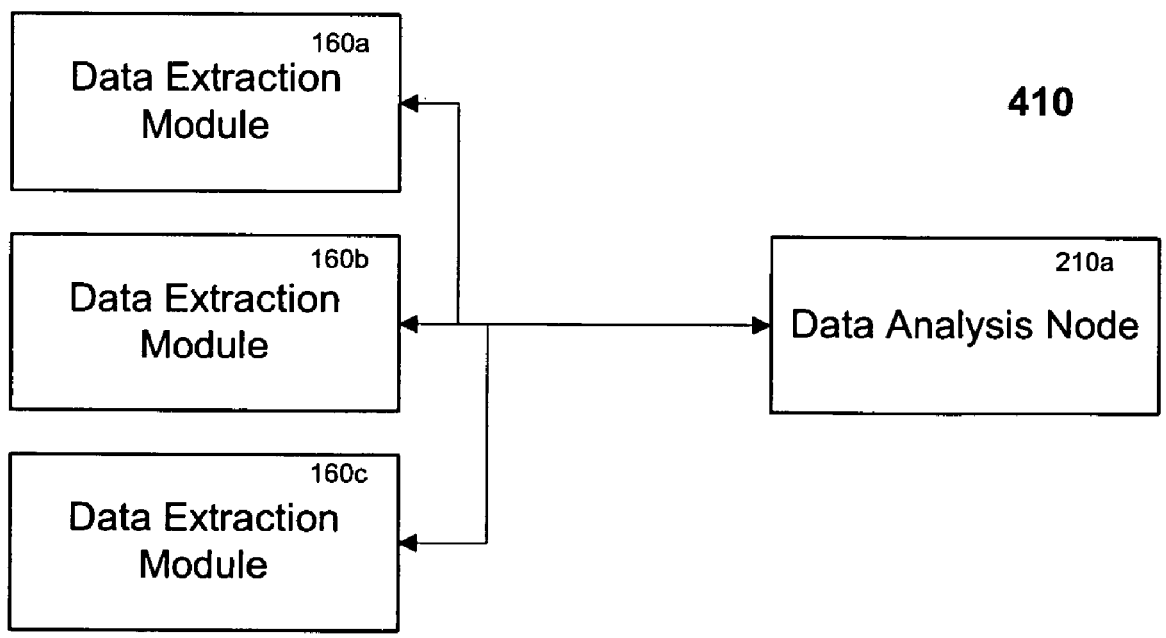
FIG. 4b presents a block diagram showing components of a transportation planning and engineering system in accordance with an alternative exemplary embodiment of the present invention.

FIG. 4b presents a block diagram 410 showing components of a transportation planning and engineering system in accordance with an alternative exemplary embodiment of the present invention. Referring to FIG. 4b, the block diagram 410 depicts multiple Data Extraction Modules 160a, 160b, 160c interacting with a single Data Analysis Node 210a. One of ordinary skill in the art would appreciate that any number of Data Extraction Modules 160 could interact with a single Data Analysis Node 210. For example, wireless telephony networks for a variety of wireless carriers could each have a Data Extraction Module 160 associated with each individual network. The data extracted by these Data Extraction Modules 160 could all be accessed and operated on by a single Data Analysis Node 210.

Figure 4C:
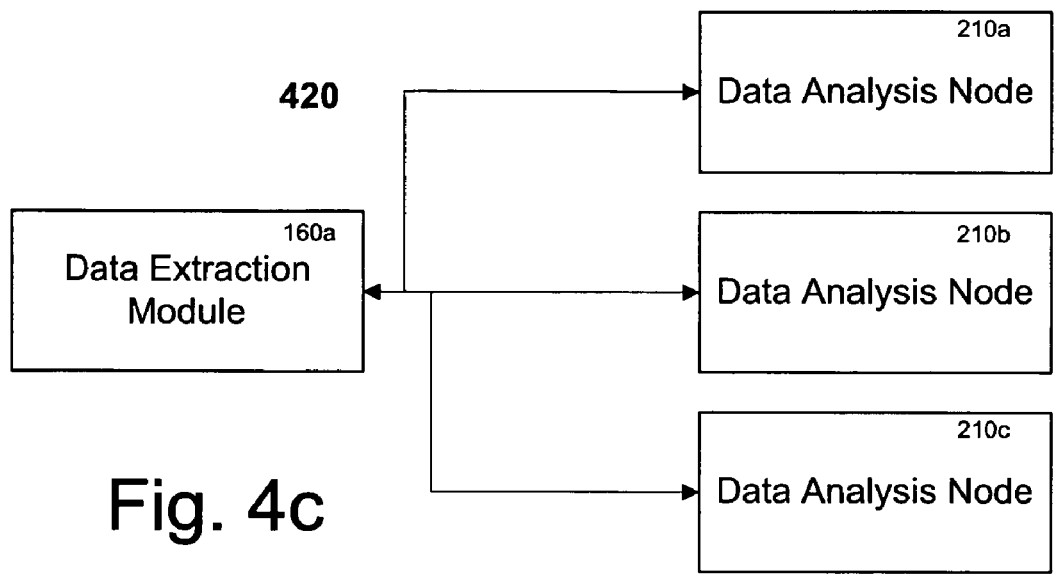
FIG. 4c presents a block diagram showing components of a transportation planning and engineering system in accordance with an alternative exemplary embodiment of the present invention.

FIG. 4c presents a block diagram 420 showing components of a transportation planning and engineering system in accordance with an alternative exemplary embodiment of the present invention. Referring to FIG. 4c, the block diagram 420 depicts a single Data Extraction Modules 160a interacting with multiple Data Analysis Nodes 210a, 210b, 210c. One of ordinary skill in the art would appreciate that any number of Data Analysis Nodes 210 could interact with a single Data Extraction Module 160. For example, individual communities or individual traffic planning and engineering applications could have a dedicated Data Analysis Node 210, each linked to a common Data Extraction Module 160.

Figure 4D:
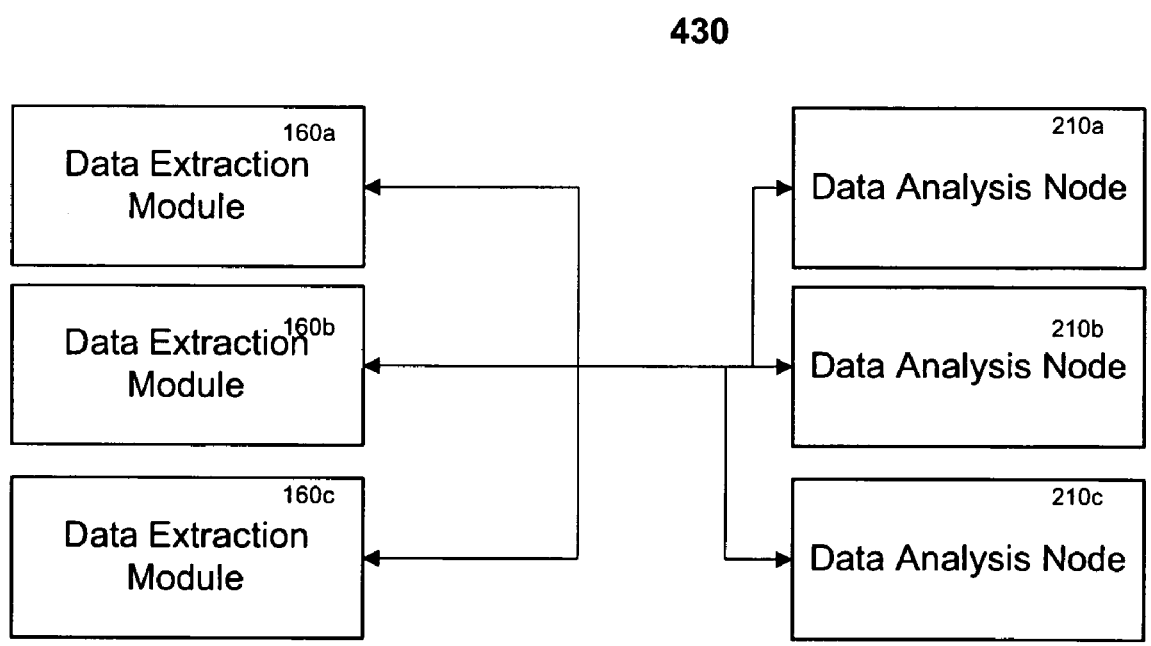
FIG. 4d presents a block diagram showing components a transportation planning and engineering system in accordance with an alternative exemplary embodiment of the present invention.

FIG. 4d presents a block diagram 430 showing components a transportation planning and engineering system in accordance with an alternative exemplary embodiment of the present invention. Referring to FIG. 4d, the block diagram 430 depicts a multiple Data Extraction Modules 160a, 160b, 160c interacting with multiple Data Analysis Nodes 210a, 210b, 210c. One of ordinary skill in the art would appreciate that any number of Data Analysis Nodes 210 could interact with any number of Data Extraction Module 160. For example, multiple individual communities or individual traffic planning and engineering applications could each have a dedicated Data Analysis Node 210, each linked to multiple Data Extraction Module 160, one for each local wireless network carrier.

Figure 5:
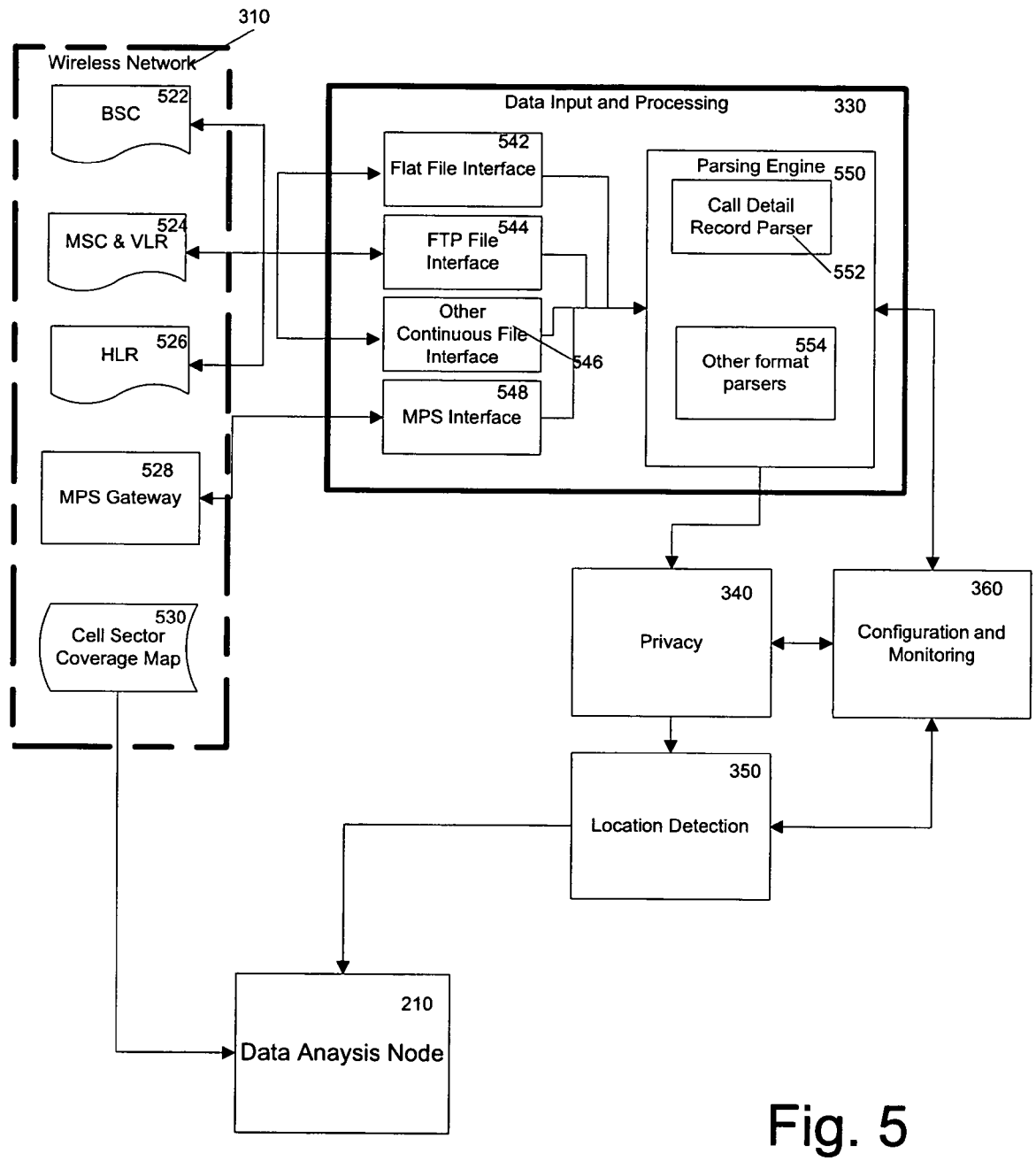
FIG. 5 depicts a block diagram of a data input and processing module within a transportation planning and engineering system in accordance with an exemplary embodiment of the present invention.

FIG. 5 depicts a block diagram 500 of a data input and processing module within a transportation planning and engineering system in accordance with an exemplary embodiment of the present invention. Referring to FIG. 5, a Data Input and Processing module 330 exchanges data with a Wireless Network Data component 310. A Data Input and Processing Module 330 includes file interfaces. These interfaces may be specific for a certain file type. In the exemplary embodiment depicted in FIG. 5, a Data Input and Processing Module 330 includes a Flat File Interface 542 and an FTP File Interface 544. These interfaces can poll the Wireless Network Data component 310, each interface polling the network component that contains the specific file type, data files on a local storage drive (flat files) and files at an FTP server (FTP files) in this exemplary embodiment.

Additionally, the Wireless Network Data component 310 may send a continuous stream of data to an Other Continuous File Interface 546, i.e., a Data Input and Processing Module 330 does not need to poll this data source. These data are taken from a BSC data store 522, MSC and VLR data store 524, and HLR data store 526 and may include call detail records, handover messages, and registration messages. One skilled in the art would appreciate that a Data Input and Processing Module 330 can be configured to collect information in whatever form the Wireless Network Data 310 generates.

In the exemplary embodiment, a Data Input and Processing Module 330 is also capable of receiving positioning data from the Wireless Network Data component 310 that include a mobile positioning system. An MPS Interface 548 interacts directly with an MPS Gateway 528 to request and receive specific MPS data. Also, the Data Analysis Node 210 can access data in concerning cell area coverage from a Cell Sector Coverage Map 530.

The file interfaces in a Data Input and Processing Module 330 send the data to a working directory. Files in the working directory cause events to be generated and sent to a Parsing Engine 550 for processing. The message contains the file name of the data file to be parsed. From this name, the most appropriate parser syntax is selected and the file is parsed. The program directory for the exemplary embodiment of the present invention contains a parser's subdirectory. Jar files containing parsers are placed in this directory. The name of the jar file must match a class name in the jar file and that class must implement the parser interface. Once implemented, the parser converts the extracted data into a format that can be used by the Privacy Module 340 and Location Detection Module 350. When the processing of the file is complete, the file is moved to a processed directory. Upon startup of the Data Input and Processing Module 330, all the files in the processed directory may be purged if they are older than a specified number of days. The specific operating parameters, such as how and when to store and delete data files, is controlled by the Configuration and Monitoring Module 360.

Figure 6:
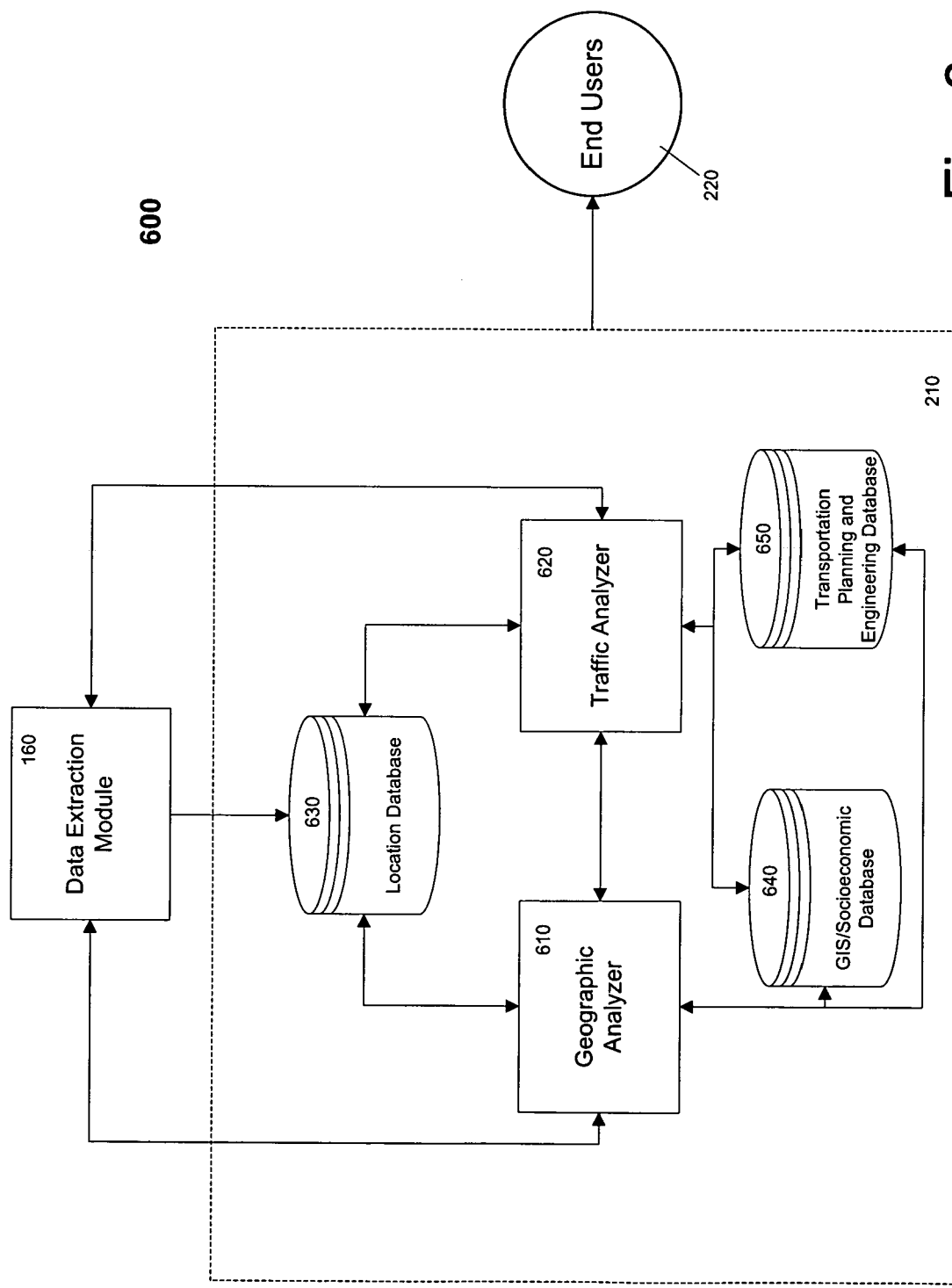
FIG. 6 depicts a block diagram of a data analysis node within a transportation planning and engineering system in accordance with an exemplary embodiment of the present invention.

FIG. 6 depicts a block diagram 600 of a data analysis node within a transportation planning and engineering system in accordance with an exemplary embodiment of the present invention. Referring to FIGS. 1, 3, and 6, the Data Analysis Node 210 includes two analysis modules: a Geographic Analyzer 610 and a Traffic Analyzer 620. The Geographic Analyzer 610 analyzes mobile station 105 location data in association with Transportation Analysis Zones (TAZs) and characterizes the relationship of the mobile stations 105 with respect to one or more TAZs.

Typical transportation planning processes often begin with the step of dividing an overall study area into sub-regions known as Transportation Analysis Zones. A typical TAZ is a rectangular area with one principal type of land use, such as residential dwellings, bounded by segments of major streets. However, a TAZ may vary in size, shape, and land use as required to meet a specific planning need. Often, TAZs are smaller and more numerous in urban areas where traffic is more dense and a finer resolution of traffic patterns is needed for effective traffic planning.

The exemplary Data Analysis Node 210 provides for a flexible way to define the TAZs to suit a particular purpose. For example, a user may simply refer to a standard boundary set as defined by a planning agency or the census bureau or define a completely new set of boundaries. A suite of geographical information systems (GIS) tools are provided as part of the Geographic Analyzer 610 that allow the user to create and edit TAZ boundaries. These tools interact with a GIS/Socioeconomic Database 640. Additional details on specific analyses performed by the Geographic Analyzer 610 of this exemplary embodiment are presented in conjunction with FIGS. 10-13, below.

Additionally, a Location Database 630 is provided. The Location Database 630 stores location records associated with mobile stations 105. The Data Extraction Module 160 generates these location records. The location records may include any of the following information: mobile station identifier; location of mobile station; time of communication event; type of communication event resulting in location record (for example, call, hand-off, registration, etc.); number called (if a call); mobile station speed; mobile station route; mobile station origin; mobile station destination; mobile station home TAZ; and mobile station work TAZ. Some of these information items are discussed below, in conjunction with process flow descriptions regarding the operation of the Data Analysis Node 210. The Location Database 630 interacts with the Data Extraction Module 160 and the Geographic Analyzer 610 and Traffic Analyzer 620. In some cases, the results of analyses performed by the Geographic Analyzer 610 and Traffic Analyzer 620 are stored in the Location Database 630 to support subsequent analyses.

The Traffic Analyzer 620 analyzes traffic flows and patterns as part of a traffic planning and engineering process. The Traffic Analyzer 620 can determine traffic routes associated with a given TAZ, estimate the speed of mobile stations 105, and determine the volume of traffic moving on selected traffic routes for a given time. For this latter example, the Traffic Analyzer 620 may report on historical traffic volumes or provide projections for future traffic volumes based on historical data and planning assumptions. For example, the Traffic Analyzer 620 may be used to predict the flow of traffic volumes along specific routes in reaction to a planned change in traffic light sequences or a planned new road.

The Traffic Analyzer 620 interacts with a Transportation Planning and Engineering Database 650. This database includes information concerning traffic management parameters, such as traffic light sequences and road volume limits, and planning scenarios to support "what-if" analyses. Additionally, information in the Transportation Planning and Engineering Database 650 may be used by the Geographic Analyzer 610 to support defining TAZs.

Although the diagram 600 depicts the Location Database 630 as part of the Data Analysis Node 210, one of ordinary skill in the art would appreciate that the Location Database 630 may be a component of the Data Extraction Module 160. The Geographic Analyzer 610 and Traffic Analyzer 620 would still interact with the Location Database 630 though any variety of data communications means used to interact with a database.

Figure 7:
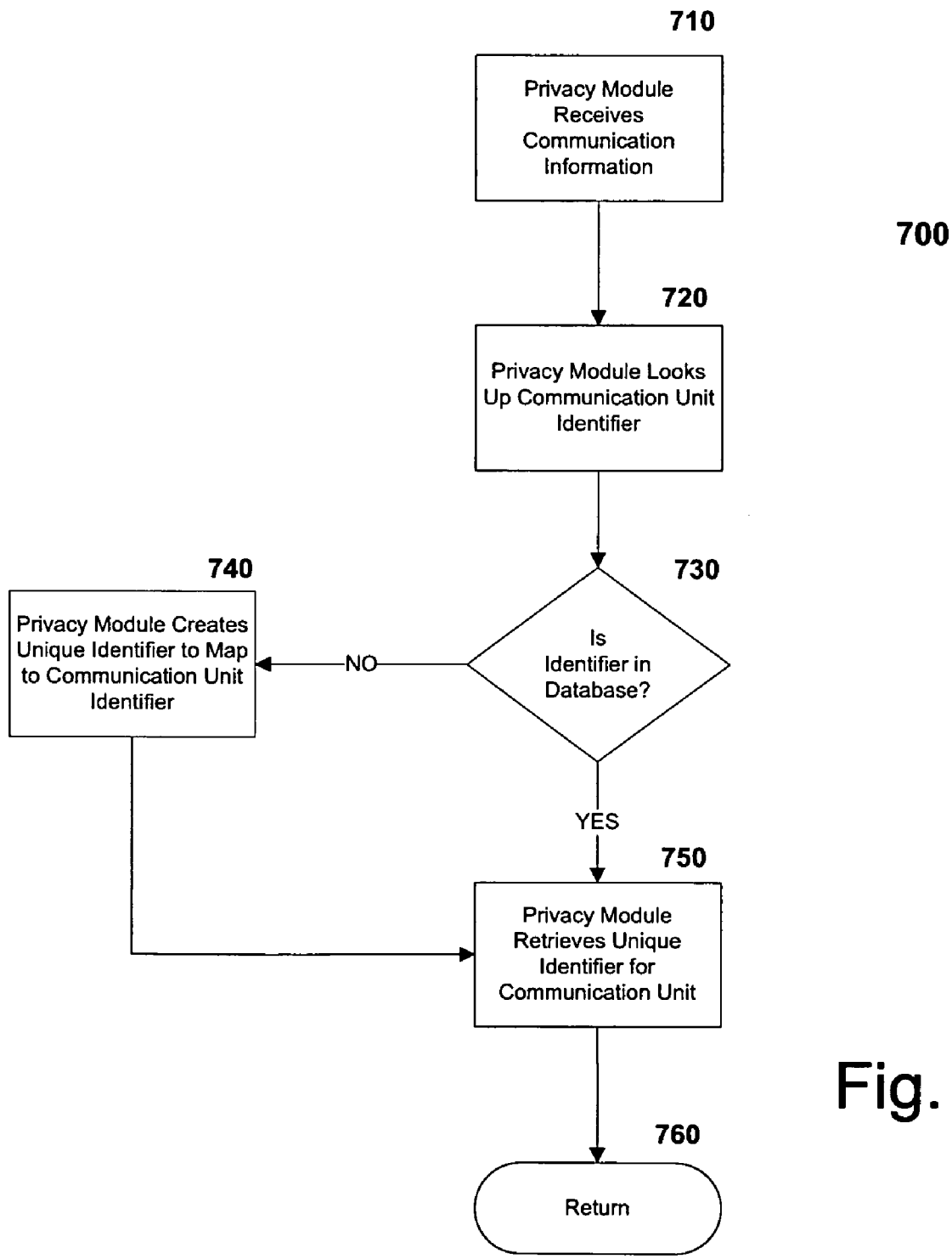
FIG. 7 presents a process flow diagram for a Privacy Module in accordance with an exemplary embodiment of the present invention.

FIG. 7 presents a process flow diagram for a Privacy Module in accordance with an exemplary embodiment of the present invention. Referring to FIGS. 3 and 7, at step 710, the Privacy Module 340 receives communication information. At step 720, the Privacy Module 340 looks up a Communication Unit Identifier associated with the communications information in a database. This Identifier may be the serial number or phone number of a mobile station. The database includes all Communication Unit Identifiers processed by the Privacy Module 340. This database may be purged periodically, such as when a record is more than 24 hours old, to provide an extra measure of privacy. Although these data may be regularly purged, any resulting anonymous location records may be maintained for a long time to support ongoing transportation planning and engineering.

At step 730, the Privacy Module 340 determines if the Communication Unit Identifier is in the database. If the result of this determination is "NO," then the Privacy Module 340 creates, at step 740, a unique identifier to map to the Communication Unit Identifier and both identifiers are stored in Privacy Module 340 database. This unique identifier could be a serial number, the results of an encryption algorithm, or other process for mapping a unique identifier with the Communication Unit Identifier. If the result of this determination is "YES," or after step 740 is complete, the Privacy Module 340 retrieves, at step 750, the unique identifier for the communications unit. The further processing of the information uses the unique identifier rather than the personal identifying information. The Privacy Module 340 then moves to step 760, where it returns to the process that invoked the Privacy Module 340.

One of ordinary skill in the art would appreciate that the Privacy Module 340 operations could take place within a Wireless Telephony Network 100 (See FIG. 1) firewall or outside the firewall. Operations of the Privacy Module 340 could be conducted by the wireless network carrier, a third party vendor, or conducted by the party operating the Data Extraction Module 160 or Data Analysis Node 210. Additionally, although a separate Privacy Module 340 database has been discussed, one of ordinary skill in the art would appreciate that a single database structure may be used to support all data storage for the system.

In some cases, the information source may apply it own processes to mask personal identifying information. For example, a Wireless Telephony Network 100 may mask personal identifying information prior to conveying the information to the Data Extraction Module 160, such as by having a system that strips this information behind the network's firewall. Alternatively, the data source could contract with a separate data aggregator that supplies the information to the Data Extraction Module 160, after personal identifying information was removed.

Figure 8:
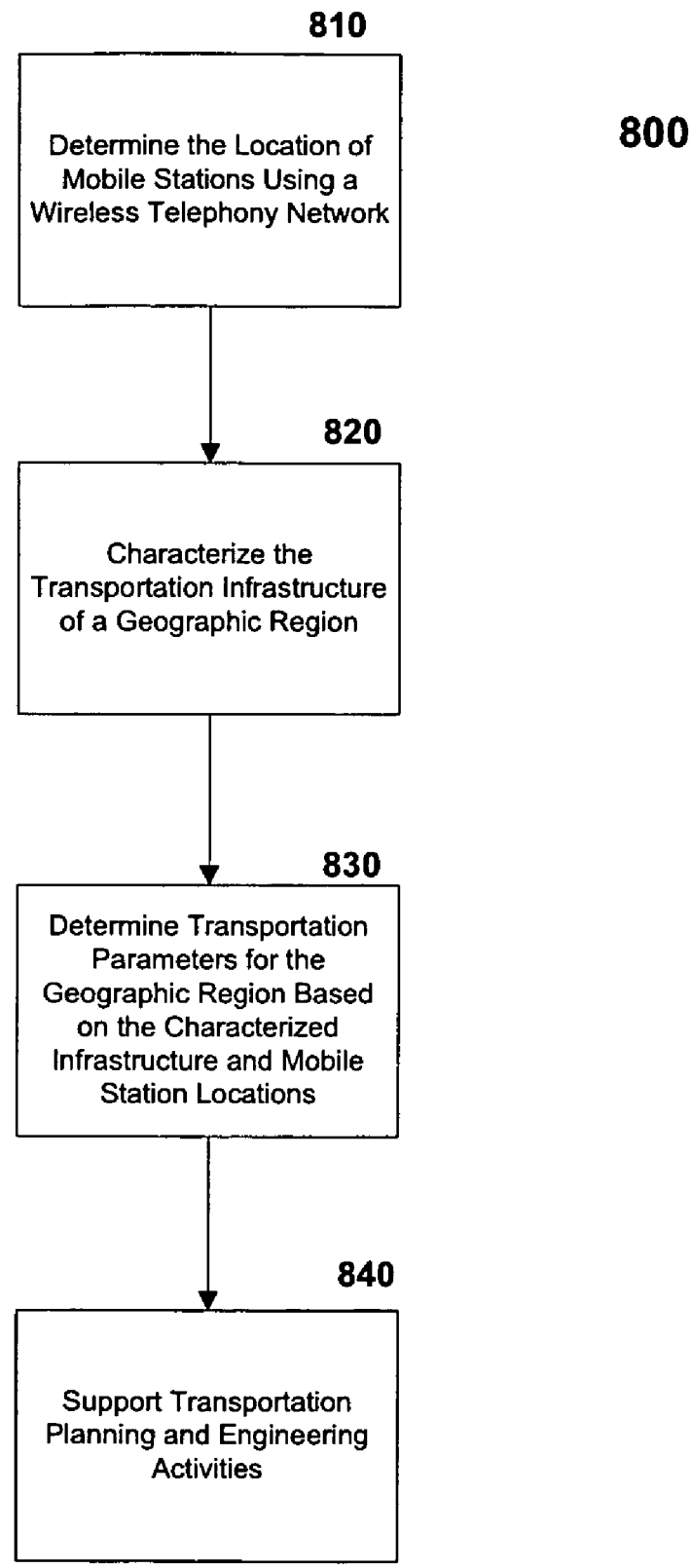
FIG. 8 presents an overall process flow diagram for traffic planning and engineering in accordance with an exemplary embodiment of the present invention.

FIG. 8 presents an overall process flow diagram 800 for traffic planning and engineering in accordance with an exemplary embodiment of the present invention. Referring to FIGS. 1, 2, and 8, at step 810, the Transportation Planning and Engineering System 250 determines the location of mobile stations 105. These mobile stations communicate through a wireless telephony network, such as Wireless Telephony Network 100. In this determination step, the Transportation Planning and Engineering System 250 may collect and store a variety of information about the mobile station 250, depending on the amount and accessibility of the information collected by the wireless network carrier. In this step, the Transportation Planning and Engineering System 250 may invoke a privacy process, such as the process described above, in connection with FIG. 7. Step 810 may be conducted by a wireless network carrier or another party. Similarly, certain third parties may perform some of the data collection or location determination processes.

At step 820, the Transportation Planning and Engineering System 250 characterizes the transportation infrastructure of a geographic region. This step may include defining TAZs and identifying transportation routes and the road segments and nodes that make up the routes. Characteristics of one or more wireless telephony networks, such as cell sector coverage, may also be included in this characterization.

At step 830, the Transportation Planning and Engineering System 250 determines transportation parameters associated with the geographic region characterized at step 820. These parameters, such as traffic speed and traffic volume, are based on mobile station 105 location determinations made at step 810.

At step 840, the Transportation Planning and Engineering System 250 supports transportation planning and engineering activities. This support may include providing summary reports of traffic conditions and predicting the impacts on traffic flow based on planning scenarios.

One of ordinary skill in the art would appreciate that transportation parameters determined using the exemplary process of FIG. 8 can support a variety of transportation planning and engineering processes. For example, the parameters may serve as input to analyses to determine trends in transportation infrastructure use or the impact of opening a new commercial enterprise, such as a large retail store, in a specific area. In some cases, the end use of the transportation parameters, that is, the transportation-related data, may dictate the form and character of the transportation parameters determined by the process 800.

Figure 9:
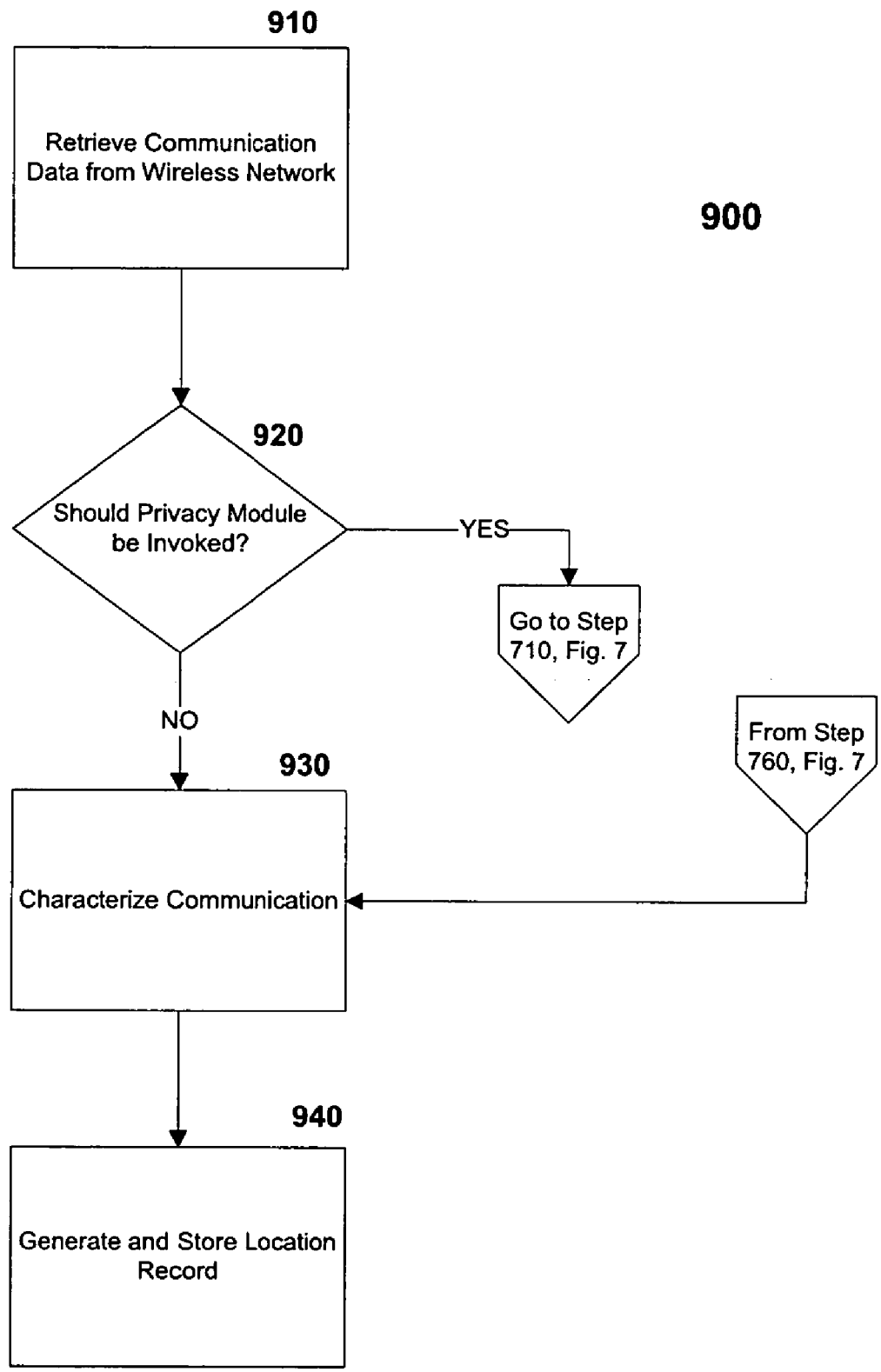
FIG. 9 presents a process flow diagram for generating location records in accordance with an exemplary embodiment of the present invention.

FIG. 9 presents a process flow diagram 900 for generating location records in accordance with an exemplary embodiment of the present invention. Referring to FIGS. 3 and 9, at step 910, the Data Extraction Module 160 retrieves communications data from the Wireless Network Data 310. At step 920, the Data Extraction Module 160 determines if a Privacy Module, such as Privacy Module 340 should be invoked. If the decision is "YES," the process 900 initiates a privacy process, such as process 700, discussed above in connection with FIG. 7. If the decision is "NO," or after the privacy process has been completed, the process 900 moves to step 930, where the communication data is characterized. For example, the communication may be a call, a hand-off, or a registration. At step 940, the Data Extraction Module 160 generates a location record. At a minimum, this record includes a mobile station identifier, an associated mobile station location, and a time stamp. The record could have additional information, including the nature of the communications, as characterized in step 930.

Figure 10:
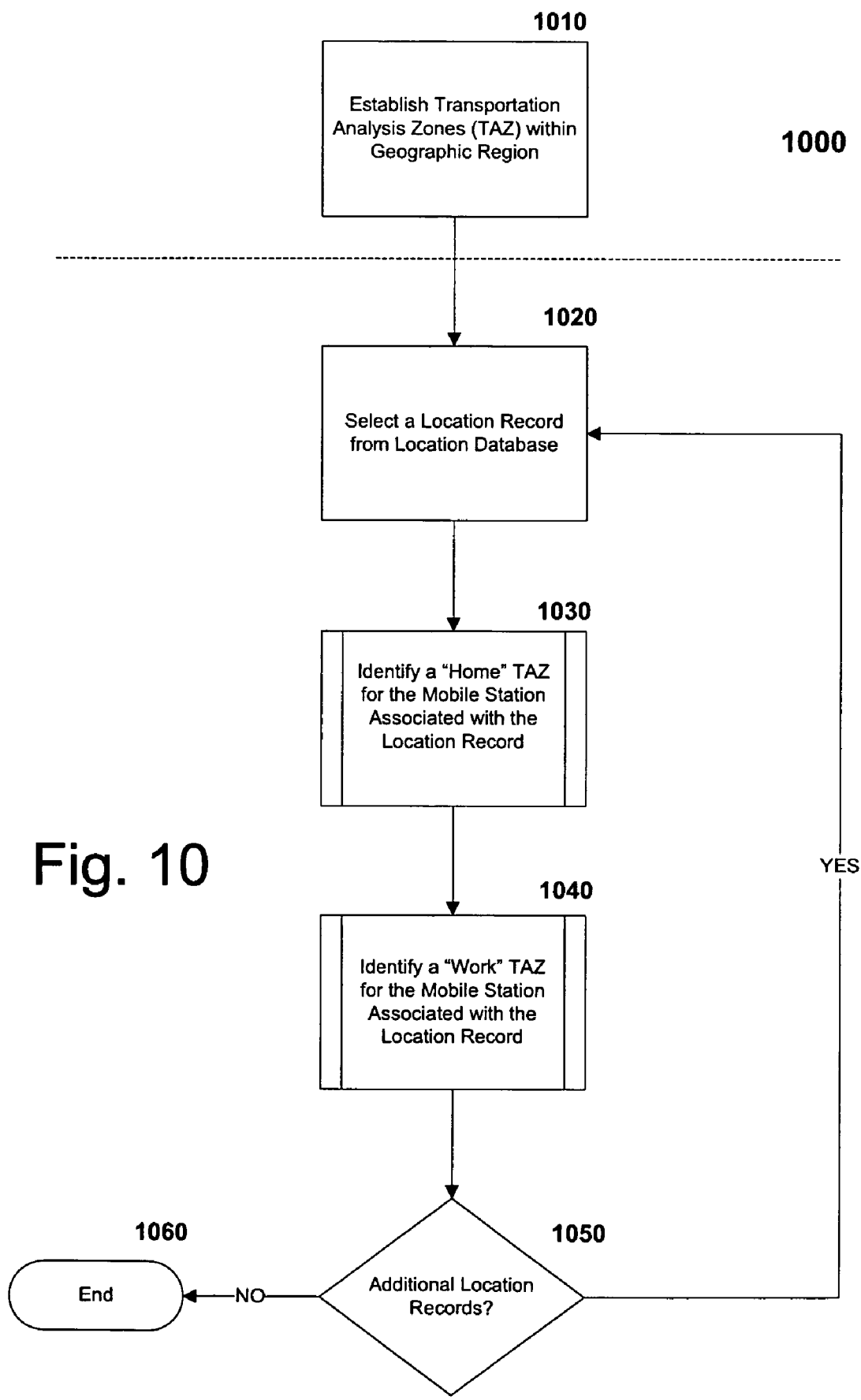
FIG. 10 presents a process flow diagram for associating a mobile station with a transportation analysis zone in accordance with an exemplary embodiment of the present invention.

FIG. 10 presents a process flow diagram 1000 for associating a mobile station with a transportation analysis zone in accordance with an exemplary embodiment of the present invention. Referring to FIGS. 1, 6 and 10, at step 1010, one or more Transportation Analysis Zones (TAZs) are established within a geographic region. Typically, the geographic region represents an area being studied for the purposes of transportation planning or engineering. Step 1010 can be performed independently of any of the other steps in this process. That is, the definition of TAZs may occur independent from and prior to performing any of the other steps of process 1000.

A TAZ represents a sub-region within a geographic region. A TAZ may be defined based on land-use boundaries, set geometric parameters, or actual physical or governmental boundaries. How a TAZ is defined may vary based on the end user of an analysis.

At step 1020, the Geographic Analyzer 610 selects a location record from the Location Database 630. At step 1030, the Geographic Analyzer 610 identifies a principal TAZ for the mobile station 105 associated with the location record. A principal TAZ may represent the TAZ where the owner of the mobile station 105 associated with the location record lives, that is, where the mobile station 105 is located during the times when users are traditionally at "home," for example from 6:00 pm to 8:00 am. Alternatively, the principal TAZ may be where the mobile station 105 spends the most time during a day. The details of this step are discussed in greater detail below, in connection with FIG. 11.

At step 1040, the Geographic Analyzer 610 identifies a secondary TAZ for the mobile station 105 associated with the location record. The secondary TAZ may represent the TAZ where the owner of the mobile station 105 associated with the location record spends most of a traditional work day, that is, such as from 8:00 am to 6:00 pm on weekdays—a "work" TAZ. The details of this step are discussed in greater detail below, in connection with FIG. 12.

At step 1050, the Geographic Analyzer 610 determines if additional location records within the Location Database 630 need designations for a primary and a secondary TAZ. If so, the process 1000 returns to step 1020. If not, the process ends at step 1060.

One of ordinary skill would appreciate that a mobile station may be associated with additional TAZs. For example, a secondary (or tertiary) TAZ may represent a commercial retail TAZ, which reflects the transportation analysis zone where the owner of a mobile station generally shops. This TAZ could be determined based on timing (such as Saturday) and geographic land use of a TAZ (such as a TAZ that includes an area around a shopping mall).

Figure 11:
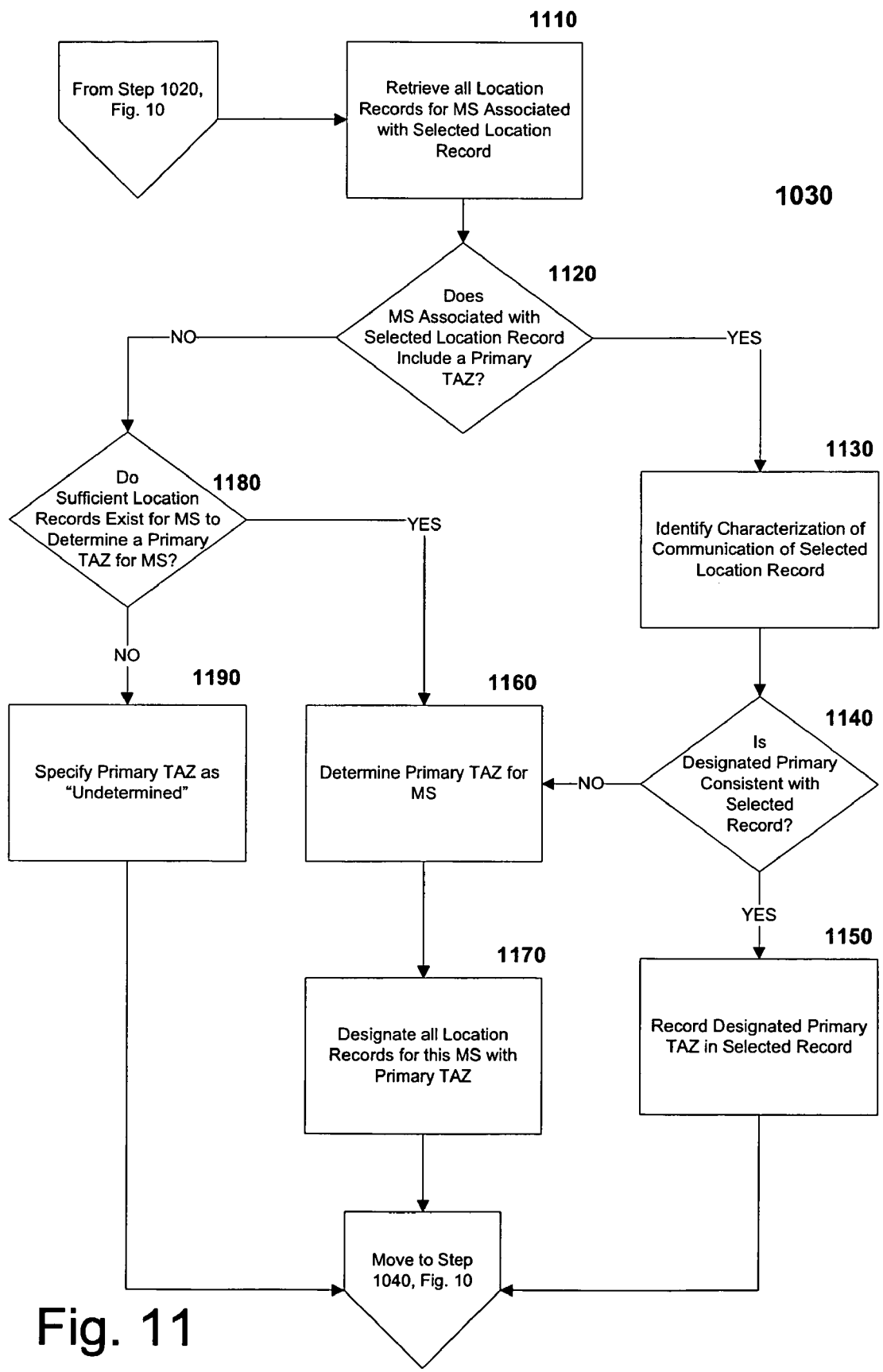
FIG. 11 presents a process flow diagram for identifying a primary transportation analysis zone for a mobile station in accordance with an exemplary embodiment of the present invention.

FIG. 11 presents a process flow diagram 1030 for identifying a primary transportation analysis zone for a mobile station in accordance with an exemplary embodiment of the present invention. Referring to FIGS. 1, 6, and 10, 11, at step 1110, the Geographic Analyzer 610 retrieves all location records associated with the mobile station 105 associated with the location record selected at step 1020. As discussed previously, each location record relates to a specific mobile station 105. At step 1110, each location record associated with a single mobile station 105 is retrieved.

At step 1120, the Geographic Analyzer 610 determines if the retrieved records indicate that the mobile station 105 has a primary TAZ associated with it. If the result of this determination is "YES," the process 1030 moves to step 1130 and the Geographic Analyzer 610 identifies the characterization of the communication associated with the location record selected at step 1020. At step 1140, the Geographic Analyzer 610 determines if the designation of a primary TAZ is consistent with the selected location record. For example, the location record may be associated with the initiation of a call from a stationary mobile station within a TAZ that is designated in other location records as that mobile station's primary TAZ. In this case, the designation would be consistent. If the designation is consistent, the process 1030 moves to step 1150 and the Geographic Analyzer 610 updates the location record selected at step 1020 to include a primary TAZ.

If the determination at step 1140 is "NO," then the process 1030 moves to step 1160 and the Geographic Analyzer 610 determines a primary TAZ for the mobile station 105. The primary TAZ may represent the "home" of the mobile station user. As such, this determination may be based on the fact, for example, that the last few location records are associated with call initiations within the same TAZ (although different from the previously designated home TAZ), and all calls initiated after 9:00 pm. One of ordinary skill in the art would appreciate that the Geographic Analyzer 610 may not be able to identify a primary TAZ, because of inconsistent location data. In that case, at step 1160, the Geographic Analyzer 610 would indicate "undetermined" for all of the location records associated with that mobile station 105. The process 1030 moves on to step 1170 all of the location records associated with that mobile station 105 are updated with the new primary TAZ.

If the determination at step 1120 is "NO," then the process 1030 moves to step 1180 and the Geographic Analyzer 610 determines if sufficient records exist to designate a primary TAZ for a mobile station 105. If the determination at step 1190 is "YES," then the process 1030 moves to step 1160 and the Geographic Analyzer 610 determines a primary TAZ for the mobile station 105. The primary TAZ may represent the "home" of the mobile station user. As such, this determination may be based on the fact, for example, that the last few location records are associated with call initiations within the same TAZ, and all initiated after 9:00 pm. The process 1030 moves on to step 1170 all of the location records associated with that mobile station 105 are updated with the new primary TAZ.

If the determination at step 1180 is "NO," then the process 1030 moves to step 1190 and the Geographic Analyzer 610 designates the primary TAZ for all of the location records associated with that mobile station 105 as "undetermined." One of ordinary skill in the art would appreciate that in many cases, a primary TAZ may never be identified for certain location records. These records may correspond to mobile stations 105 that pass through the geographic region, such as out-of-state travelers on an interstate highway. One of ordinary skill in the art would appreciate that as more location records are collected for a specific mobile station, the system can more likely identify a primary TAZ for that mobile station.

Figure 12:
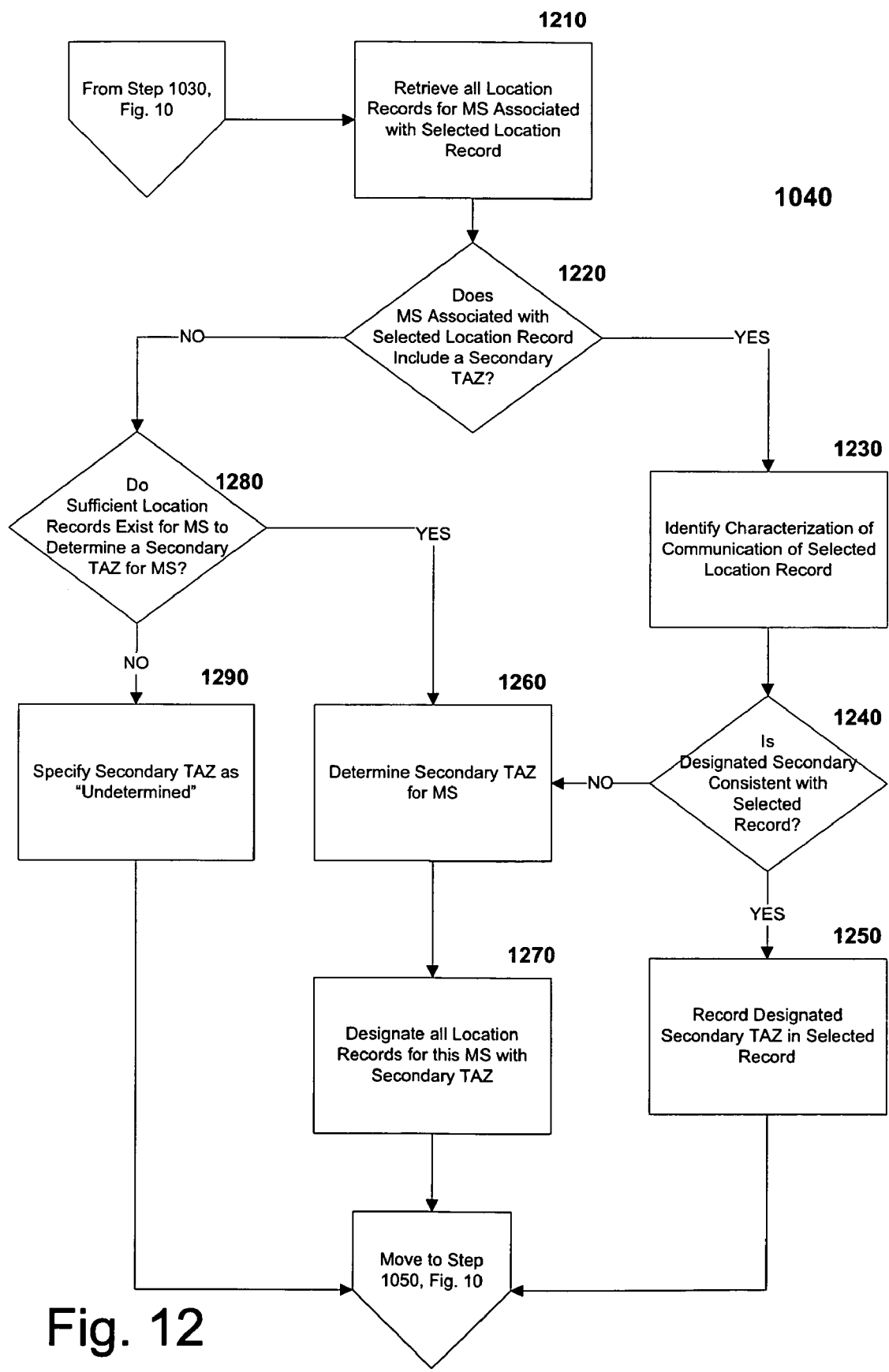
FIG. 12 presents a process flow diagram for identifying a secondary transportation analysis zone for a mobile station in accordance with an exemplary embodiment of the present invention.

FIG. 12 presents a process flow diagram 1040 for identifying a secondary transportation analysis zone for a mobile station in accordance with an exemplary embodiment of the present invention. Referring to FIGS. 1, 6, and 10, 12, at step 1210, the Geographic Analyzer 610 retrieves all location records associated with the mobile station 105 associated with the location record selected at step 1020. As discussed previously, each location record relates to a specific mobile station 105. At step 1210, each location record associated with a single mobile station 105 is retrieved.

At step 1220, the Geographic Analyzer 610 determines if the retrieved records indicate that the mobile station 105 has a secondary TAZ associated with it. If the result of this determination is "YES," the process 1040 moves to step 1230 and the Geographic Analyzer 610 identifies the characterization of the communication associated with the location record selected at step 1020. At step 1240, the Geographic Analyzer 610 determines if the designation of a secondary TAZ is consistent with the selected location record. For example, the location record may be associated with the initiation of a call from a stationary mobile station within a TAZ that is designated in other location records as that mobile station's secondary TAZ. In this case, the designation would be consistent. If the designation is consistent, the process 1040 moves to step 1250 and the Geographic Analyzer 610 updates the location record selected at step 1020 to include a secondary TAZ.

If the determination at step 1140 is "NO," then the process 1040 moves to step 1260 and the Geographic Analyzer 610 determines a secondary TAZ for the mobile station 105. The secondary TAZ may represent the "work place" of the mobile station user. As such, this determination may be based on the fact, for example, that the last few location records are associated with call initiations within the same TAZ (although different from the previously designated secondary TAZ), and all initiated around 5:00 pm. One of ordinary skill in the art would appreciate that the Geographic Analyzer 610 may not be able to identify a new secondary TAZ, because of inconsistent location data. In that case, at step 1260, the Geographic Analyzer 610 would indicate "undetermined" for all of the location records associated with that mobile station 105. The process 1040 moves on to step 1270 all of the location records associated with that mobile station 105 are updated with the new secondary TAZ.

If the determination at step 1220 is "NO," then the process 1040 moves to step 1280 and the Geographic Analyzer 610 determines if sufficient records exist to designate a secondary TAZ for a mobile station 105. If the determination at step 1290 is "YES," then the process 1040 moves to step 1260 and the Geographic Analyzer 610 determines a secondary TAZ for the mobile station 105. The secondary TAZ may represent the "work-place" of the mobile station user. As such, this determination may be based on the fact, for example, that the last few location records are associated with call initiations within the same TAZ, and all initiated around 5:00 pm. The process 1040 moves on to step 1270 all of the location records associated with that mobile station 105 are updated with the new secondary TAZ.

If the determination at step 1280 is "NO," then the process 1040 moves to step 1290 and the Geographic Analyzer 610 designates the secondary TAZ for all of the location records associated with that mobile station 105 as "undetermined." As with the case of primary TAZs, one of ordinary skill in the art would appreciate that in many cases, a secondary TAZ will never be identified for certain location records. These records may correspond to mobile stations 105 that pass through the geographic region, such as out-of-state travelers on an interstate highway. One of ordinary skill in the art would appreciate that as more location records are collected for a specific mobile station, the system can more likely identify a secondary TAZ for that mobile station.

Figure 13A:
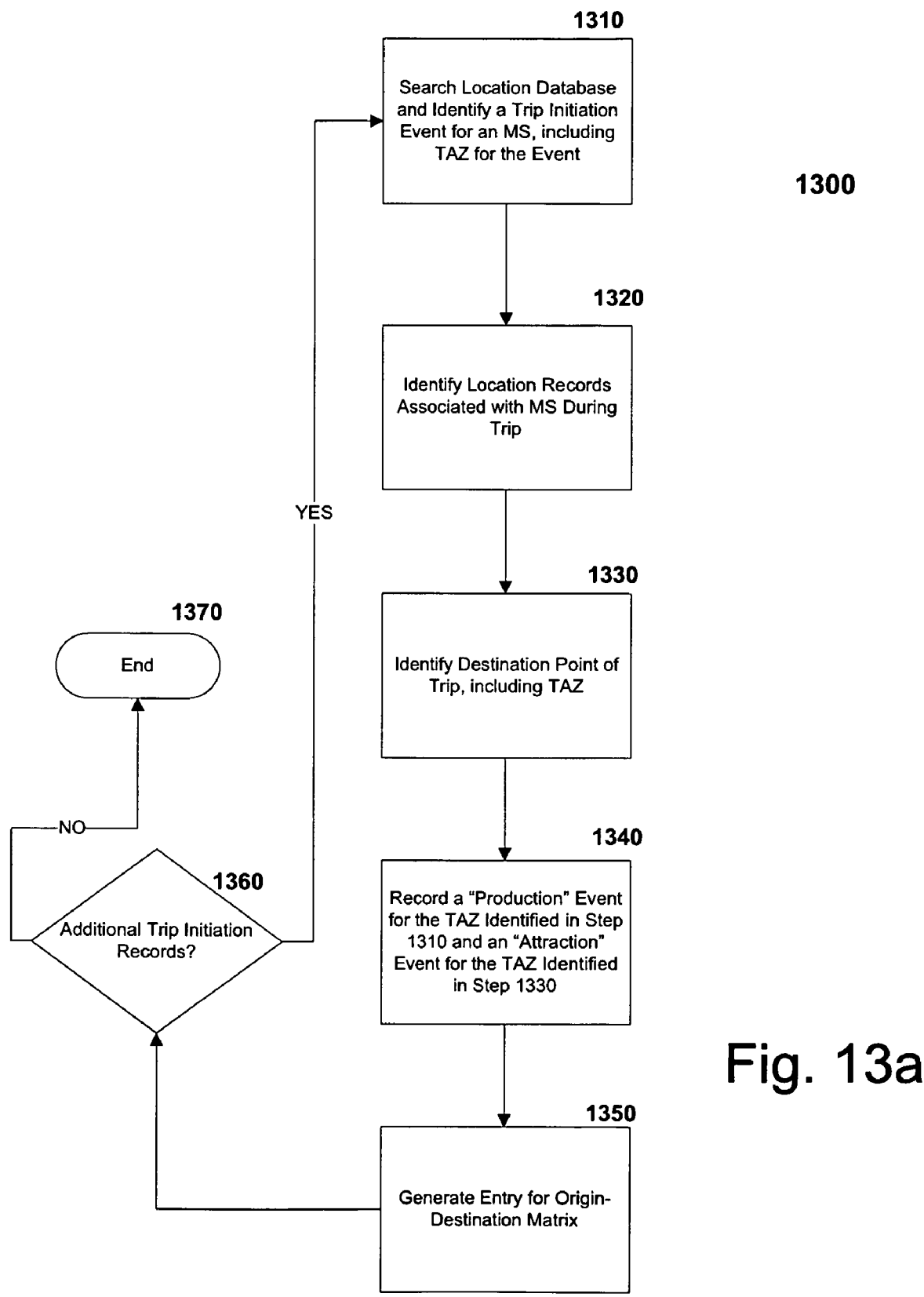
FIG. 13a presents a process flow diagram for generating an origin-destination matrix in accordance with an exemplary embodiment of the present invention.

FIG. 13a presents a process flow diagram 1300 for generating an origin-destination (OD) matrix in accordance with an exemplary embodiment of the present invention. Referring to FIGS. 1, 6, and 13a, at step 1310, the Geographic Analyzer 610 searches the Location Database 630 and identifies location records associated with a trip initiation event for a mobile station 105 and identifies the TAZ associated with that location record.

Since the location records for any mobile station do not provide a continuous picture of the locations of that mobile station, the origin or destination of a trip may be determined by observing multiple sequential sightings of the mobile station within the same TAZ over some period of time, yet moving within that TAZ. The time of departure is assumed to be the time of the last sighting in the origin TAZ just prior to the change in locations (that is, a move into a new TAZ). A trip initiation event then is the sequence of location records providing a mobile station in the same TAZ over some period of time that also indicates that the mobile station is moving.

At step 1320, the Geographic Analyzer 610 identifies location records associated with the mobile station 105 indicating that the mobile station has moved into an adjacent TAZ. This identification step is repeated until the event of step 1330. That is, the Geographic Analyzer 610 tracks the movement of the mobile station 105 until it determines that the mobile station has moved into its destination TAZ. At step 1330, the Geographic Analyzer 610 identifies that the mobile station 105 has reached a destination TAZ. This determination may be made when location records indicate that, for a certain period of time, the location record indicates that the mobile station 105 has remained in a TAZ.

At step 1340, the Geographic Analyzer 610 records a "production" event for the TAZ identified at Step 1310 and an "attraction" event for the TAZ identified at step 1330. At step 1350, the Geographic Analyzer 610 generates an entry for an OD matrix. Such a matrix can be used to provide estimates of the movement of traffic throughout a geographic region. Process 1300 can be used to replace the difficult and often costly exercise of using direct measurements and surveys to generate a comparable OD matrix. One of ordinary skill in the art would appreciate that the estimates generated from the process 1300 may be modified by a factor that accounts for the fact that the estimate is based on cell phone use. For example, the estimates may be adjusted by a factor that represents the ratio of the number of drivers that keep their cell phone on at all times to the total number of cars.

At step 1360, the Geographic Analyzer 610 determines if location records indicate an additional trip initiation event. If the determination is "YES," the process 1300 returns to step 1310 and repeats. Otherwise, the process 1300 moves to step 1370 and ends.

Figure 13B:
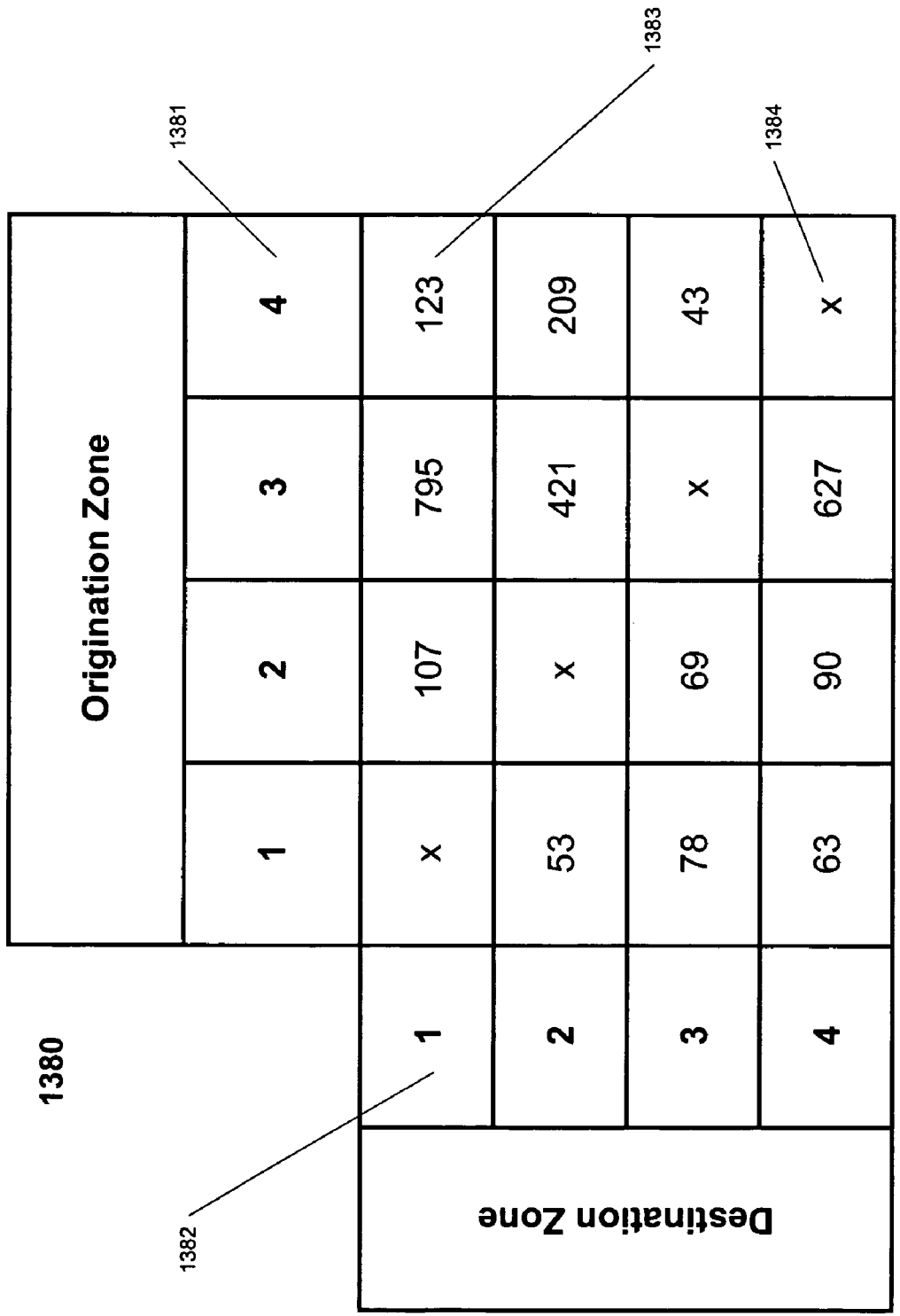
FIG. 13b provides a representative example of an origin-destination matrix in accordance with an exemplary embodiment of the present invention.

FIG. 13b provides a representative example of an OD matrix 1380 in accordance with an exemplary embodiment of the present invention. Referring to FIG. 13b, the matrix 1380 includes column headings for origination zones, or TAZs, such as zone "4" 1381. The matrix 1380 includes row headings for destination zones, or TAZs, such as zone "1" 1382. The matrix 1380 also includes entries, such as entry 1383. These entries represent the number of trips that originate in an indicated origination zone and terminate in an indicated destination zone. For example, the entry 1383 is "123." This entry 1383 means that 123 trips originated in zone 4 1381 and terminated in zone 1 1382 over a time period of concern. The matrix 1380 measures interzone trips. As such, the entries for a trip originating and ending in the same zone have no values, such as entry 1384, which is represented by an "x."

Transportation planners and engineers use the OD matrix in describing transportation patterns in a region. This matrix has information on the travel and transportation made between different zones of a region. The OD matrix provides a simple reference of overall traffic movement and identifies potential areas of concern, for example, a high-density destination area. The OD matrix may be used to identify possible choke points in a transportation system. The OD matrix traditionally might be estimated using traffic counts on links in the transport network and other available information. This information on the travel is often contained in a target OD matrix. The target OD matrix may be an old (probably outdated) matrix or a result from a sample survey. Results from the survey must be extrapolated to determine an accurate OD matrix. The present invention provides a more reliable and complete set of travel observations to produce an accurate picture of the travel patterns throughout a region.

Figure 14:
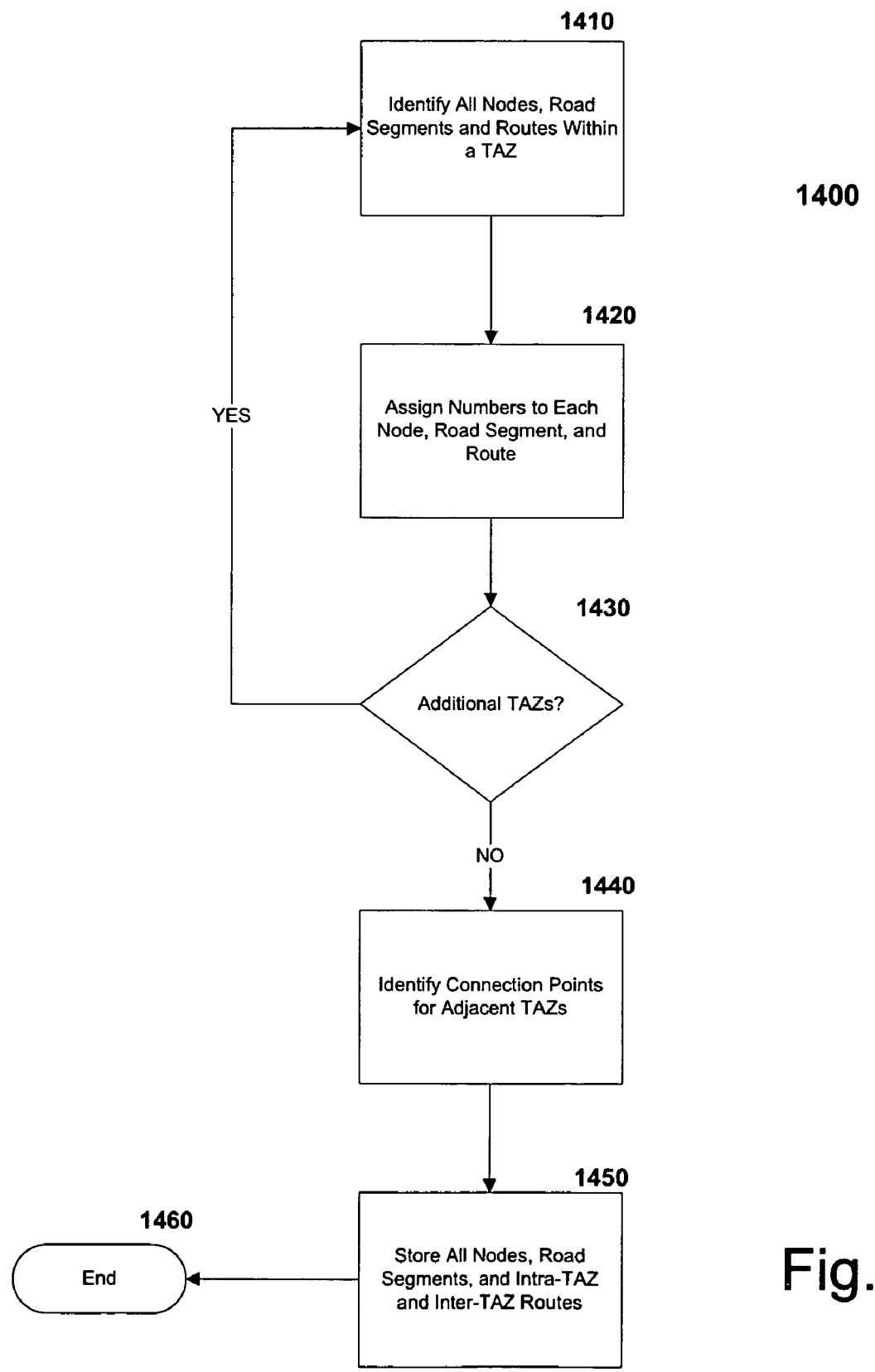
FIG. 14 presents a process flow diagram for identifying transportation routes associated with a transportation analysis zone in accordance with an exemplary embodiment of the present invention.

FIG. 14 presents a process flow diagram 1400 for identifying transportation routes associated with a transportation analysis zone in accordance with an exemplary embodiment of the present invention. Referring to FIGS. 1, 2, 6, and 14, at step 1410, the Traffic Analyzer 620 identifies all nodes, road segments, and routes within a TAZ. Nodes are typically located at street intersections, but may also be located at points of interest. A segment is the portion of a street joining two nodes. Routes are formed as contiguous sets of road segments with specific endpoints or end zones. Numbers, or some other type of designator, may be assigned to the nodes, segments, and routes. The node, segment, and route designators, along with their attributes, such as travel times for each segment may be used by the Transportation Planning and Engineering System 250. During step 1410, the Traffic Analyzer 620 may access the GIS/Socioeconomic Database 640 to identify nodes, road segments, and routes. Additionally, the Traffic Analyzer 620 may access cell sector maps for a wireless telephony network to associate specific cell sectors with nodes, road segments, and routes.

At step 1420, the Traffic Analyzer 620 assigns a number or other designator to each node, route segment, and route within a TAZ. At step 1430, the Traffic Analyzer 620 determines if additional TAZs exist to be characterized. If the determination is "YES," the process 1400 returns to step 1410 and the process is repeated for the next TAZ. If the determination at step 1430 is "NO," the process 1400 moves to step 1440 and connection points for adjacent TAZs are identified. In other words, at step 1440, the Traffic Analyzer 620 identifies locations (designated as nodes) were a road segment crosses the border of adjacent TAZs.

At step 1450, the Traffic Analyzer 620 stores all nodes, road segments, and intra-TAZ and inter-TAZ routes in a database, such as the Transportation Planning and Engineering Database 650. Process 1400 can be repeated as necessary to update the road information.

Figure 15:
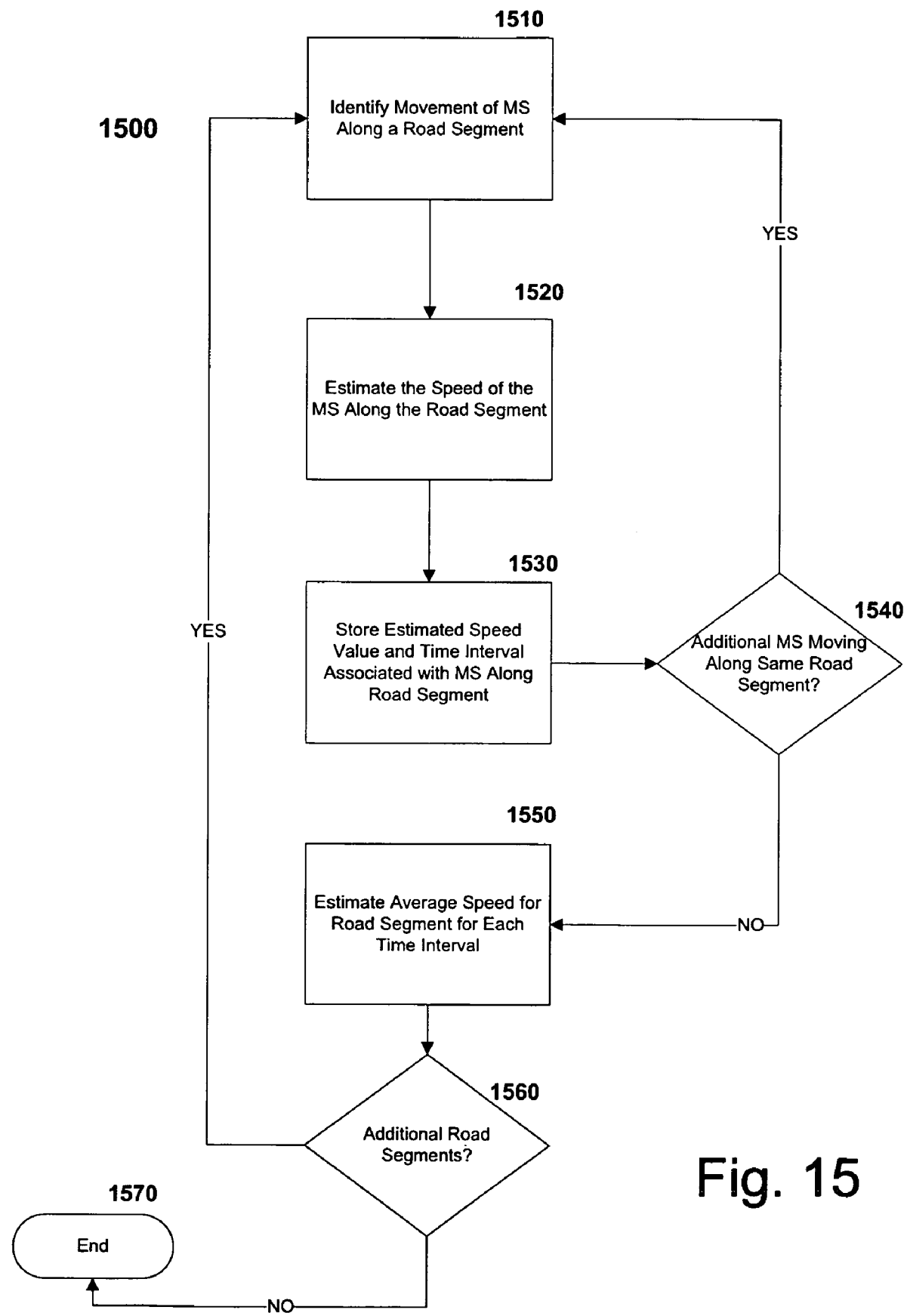
FIG. 15 presents a process flow diagram for estimating the average speed for a road segment in accordance with an exemplary embodiment of the present invention.

FIG. 15 presents a process flow diagram 1500 for estimating the average speed for a road segment in accordance with an exemplary embodiment of the present invention. Referring to FIGS. 1, 6, and 15, at step 1510, the Traffic Analyzer 620 identifies a mobile station 105 moving along a route. This step may include the Traffic Analyzer 620 identifying from the Location Database 630 location records for a common mobile station 105 at times that are close together, where the locations vary. In this case, the Traffic Analyzer 620 can determine the road segment or routes that the mobile station traveled during that time. In some cases, a variety or routes may have been taken between the locations indicated by two location records. One of ordinary skill in the art would appreciate that a number of ways could be used to assign a route, such as shortest distance, fastest route, or previously traveled route, if historic data for the mobile station indicates a consistently traveled route.

At step 1520, the Traffic Analyzer 620 estimates the speed of the mobile station 105 along the road segment or route. This estimate is the travel distance between two location records divided by the time between the two location records. At step 1530, the Traffic Analyzer 620 stores estimated speed value and time interval, that is, the time of day and date, associated with the mobile station 105 and route. These data may be stored in the Transportation Planning and Engineering Database 650 or in the Location Database 630. Indeed, one of ordinary skill in the art would appreciate that a single database could be used to manage all of the data associated with the present invention.

At step 1540, the Traffic Analyzer 620 determines if additional mobile stations 105 are moving along the same road segment at the same time, as indicated by location records. If the determination is "YES," the process 1500 returns to step 1510 and repeats the steps for the next mobile station 105. If the determination is "NO," the process 1500 moves to step 1550 and the Traffic Analyzer 620 estimates the average speed for a road segment for each time interval. The average speed for the road segment may simply be the sum of the speeds for each mobile station 105 divided by the number of mobile stations. The speed algorithm may have additional levels of sophistication, such as the capability of screening out mobile stations 105 that are not associated with cars, such as pedestrians. A time interval is a set time span, such as 7:00 am to 7:10 am on Tuesdays, and the duration of the interval may vary by time interval. For example, another time interval may be Sunday from 12 midnight to 6:00 am.

U.S. Pat. No. 6,842,620, entitled System and Method for Providing Traffic Information Using Operational Data of a Wireless Network describes one way that a mobile station's movement can be assigned to road segments and speed estimated. The specification of U.S. Pat. No. 6,842,620 is hereby fully incorporated herein by reference.

At step 1560, the Traffic Analyzer 620 determines if additional road segments need to be analyzed. If the determination is "YES," the process 1500 returns to step 1510 and repeats the steps for the next road segment. If the determination is "NO," the process 1500 moves to step 1570 and terminates. Process 1500 may be run frequently to update transportation route data. Additionally, the process 1500 may be run daily to establish a complete historical picture of traffic flow in an area.

Figure 16:
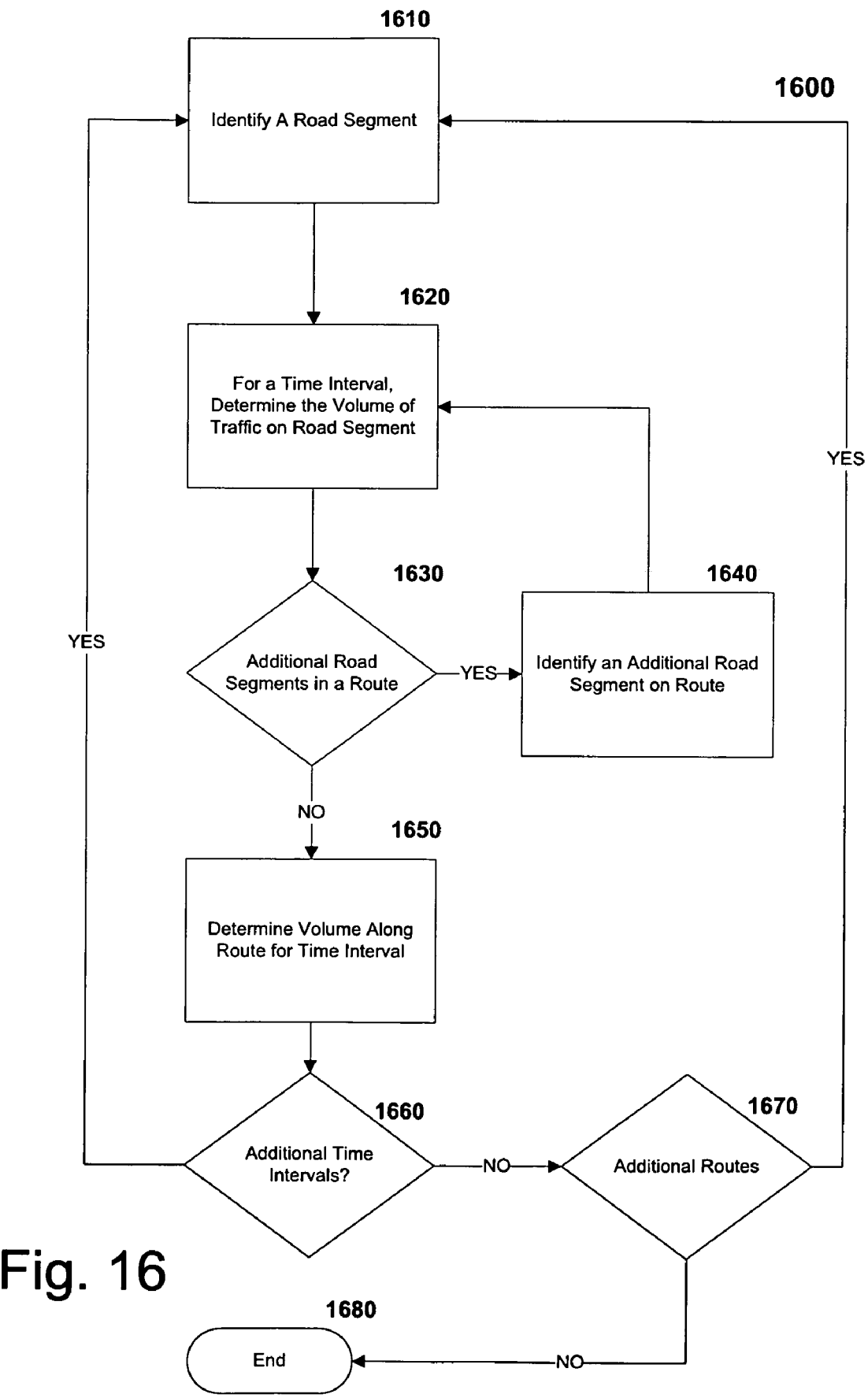
FIG. 16 presents a process flow diagram for estimating traffic volume in accordance with an exemplary embodiment of the present invention.

FIG. 16 presents a process flow diagram 1600 for estimating traffic volume in accordance with an exemplary embodiment of the present invention. Referring to FIGS. 1, 6, and 16, at step 1610, the Traffic Analyzer 620 identifies a road segment for a route of interest. At step 1620, for a given time interval, the Traffic Analyzer 620 determines the volume of traffic on a road segment. The time interval may be a specific day and time, such as Mar. 6, 2006 between 7:00 am and 7:10 am or may represent multiple days, such as Tuesday mornings over the past year between 7:00 am and 7:10 am. This volume estimate is based on the number of mobile stations 105 on the road segment, as indicated in location records. This estimate may be adjusted by a factor to account for those vehicles that do not have cellular phones on. Also, for an aggregated time interval, the volume would typically be reported as a daily average for the time interval and may include other statistical measures. For example, for the "Tuesday mornings over the past year between 7:00 am and 7:10 am" case, the result may be "47 cars per day on average, plus or minus 7, with a maximum of 68 on Feb. 7, 2006."

At step 1630, the Traffic Analyzer 620 determines if additional road segments comprise the route of interest. If the determination is "YES," the process 1600 moves to step 1640 and identifies additional road segments on the route. This identification may be made by querying the Transportation Planning and Engineering Database 650. The process 1600 then moves back to step 1620 and repeats. If the determination is "NO," the process 1600 moves to step 1650 and determines the volume along the entire route.

At step 1660, the Traffic Analyzer 620 determines if additional time intervals need to be evaluated. If the determination is "YES," the process 1600 returns to step 1610, using the same route of interest. If the determination is "NO," the Traffic Analyzer 620 determines if additional routes are to be analyzed. If the determination is "YES," the process 1600 returns to step 1610 and identifies a road segment from the new route of interest. If the determination is "NO," the process 1600 moves to step 1680 and ends.

Figure 17:
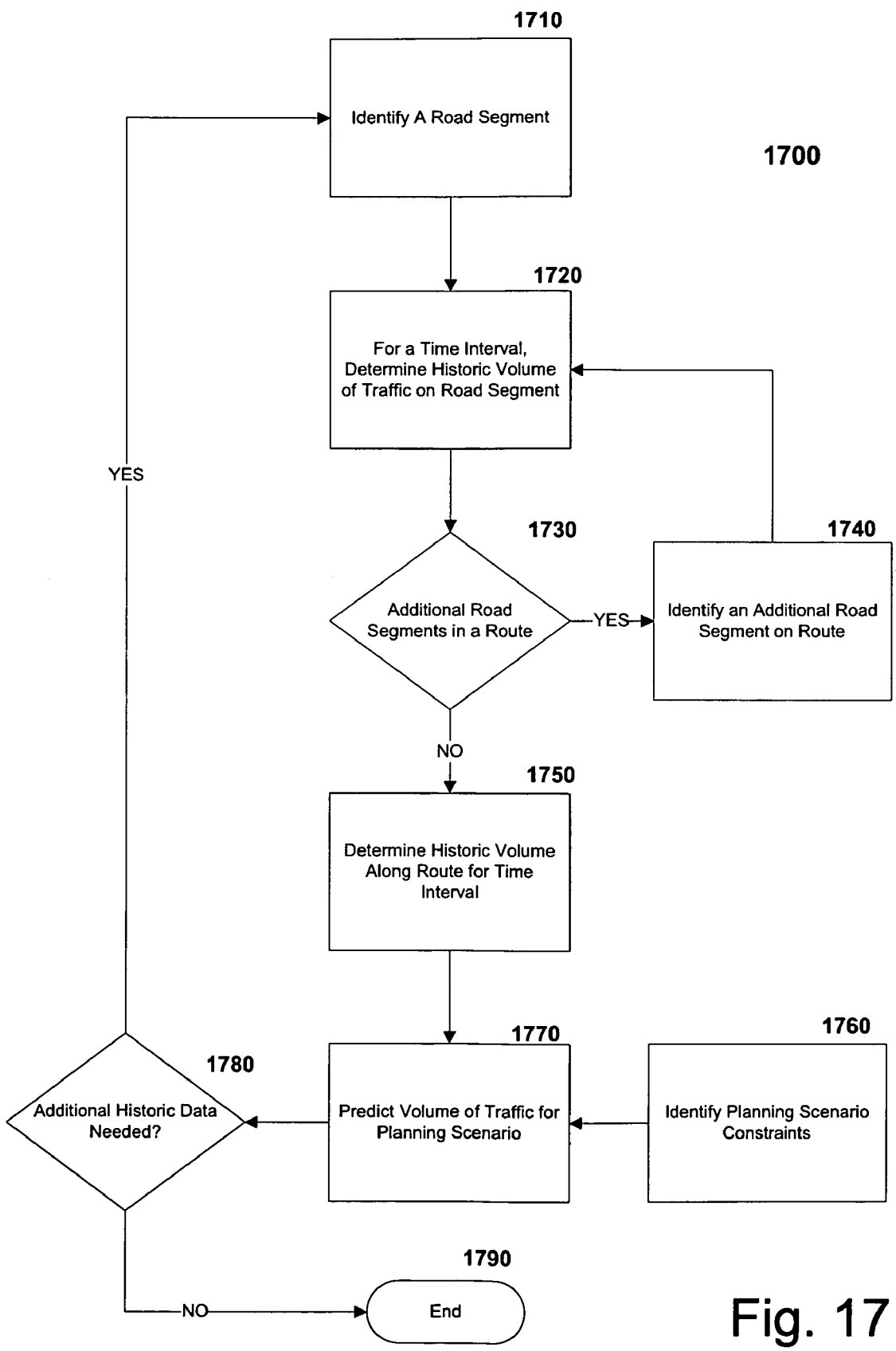
FIG. 17 presents a process flow diagram for predicting traffic volume in accordance with an exemplary embodiment of the present invention.

FIG. 17 presents a process flow diagram 1700 for predicting traffic volume in accordance with an exemplary embodiment of the present invention. Referring to FIGS. 1, 2, 6, and 17, at step 1710, the Traffic Analyzer 620 identifies a road segment for a route of interest. At step 1720, for a given time interval, the Traffic Analyzer 620 determines the historic volume of traffic on a road segment. The time interval may be a specific day and time, such as Mar. 6, 2006 between 7:00 am and 7:10 am or may represent multiple days, such as Tuesday mornings over the past year between 7:00 am and 7:10 am. This volume estimate is based on the number of mobile stations 105 on the road segment, as indicated in location records. This estimate may be adjusted by a factor to account for those vehicles that do not have cellular phones on. Also, for an aggregated time interval, the volume would typically be reported as a daily average for the time interval and may include other statistical measures, as discussed above.

At step 1730, the Traffic Analyzer 620 determines if additional road segments comprise the route of interest. If the determination is "YES," the process 1600 moves to step 1740 and identifies additional road segments on the route. This identification may be made by querying the Transportation Planning and Engineering Database 650. The process 1700 then moves back to step 1720 and repeats. If the determination is "NO," the process 1700 moves to step 1750 and determines the historic traffic volume along the entire route.

At step 1760, planning scenario constraints are provided. These constraints may include narrowing a road from two lanes in one direct to one lane (for example, in anticipation of construction activities), changing the sequence of traffic lights at a specific traffic node, or changing the posted speed along a road segment. These planning scenario constraints enable traffic planners to predict the impact of certain changes to travel route conditions. End users, such as End Users 220, may supply these constraints.

At step 1770, the Traffic Analyzer 620 predicts the volume of traffic on the route based on the constraints. The prediction may be based on adjusting average speeds along a route and determining the impact on vehicles leaving specific road segments. The results of this type of analysis can then be used to modify volume estimates for a road way.

At step 1780, the Traffic Analyzer 620 determines if additional historical data is needed. For example, the Traffic Analyzer 620 may need to determine the historical traffic flow along alternate routes to determine if an increase in traffic congestion along one route may be offset by more vehicles taking an alternate route.

One of ordinary skill in the art would appreciate that steps 1710 through 1750 may occur independently from subsequent steps in the process 1700. If the determination is "YES," the process 1700 returns to step 1710 and identifies additional routes of interest. If the determination is "NO," the process 1700 moves to step 1790 and ends.

In view of the foregoing, one would appreciate that the present invention supports a system and method for using data from a wireless telephony network to support transportation planning and engineering. Data related to wireless network users is extracted from the wireless network to determine the location of a mobile station. Additional location records for the mobile station can be used to characterize the movement of the mobile station: its speed, its route, its point of origin and destination, and its primary and secondary transportation analysis zones. Aggregating data associated with multiple mobile stations allows characterizing and predicting traffic parameters, including traffic speeds and volumes along routes.

What is claimed is:

1. A method for providing an origination-destination matrix comprising the steps of:

identifying a trip initiation event for a trip associated with a mobile station;

determining a transportation analysis zone associated with the trip initiation event;

identifying a plurality of location records associated with the trip for the mobile station, wherein the location records comprise locations of the mobile station after the trip initiation event;

identifying a destination point associated with the trip, wherein the destination point comprises one of the plurality of location records and the location record represents the final location of the mobile station;

determining the transportation analysis zone associated with the destination point; and recording the origination and destination of the trip in the origination-destination matrix, the origination being the transportation analysis zone associated with the trip initiation event and destination being the transportation analysis zone associated with the destination point, wherein the origination-destination matrix comprises at least two dimensions wherein a first dimension comprises a plurality of transportation analysis zones within a geographic area associated with an origin of a trip and the second dimension comprises a plurality of transportation analysis zones within a geographic area associated with a destination of a trip.

2. The method of claim 1 further comprising the step of estimating the movement of traffic through a geographic region comprising the transportation analysis zone associated with the trip initiation event and the transportation analysis zone associated with the destination point within a certain period of time.

3. The method of claim 1 further comprising the step of characterizing the purpose of the trip.

4. The method of claim 3 wherein the step of characterizing the purpose of the trip comprises determining whether the trip is to the user of the mobile station's location of work.

5. The method of claim 1 further comprising the steps of determining if the location associated with the trip initiation event is the residence of the user of the mobile station and determining if the location associated with the trip initiation event is the either the workplace of the user of the mobile station or a commercial retail location visited by the user of the mobile station.

6. The method of claim 1 further comprising the steps of determining a primary transportation analysis zone for the mobile station.

* * * * *